US012744375B2

(12) United States Patent
Palit et al.

(10) Patent No.: US 12,744,375 B2
(45) Date of Patent: Sep. 22, 2026

(54) METHODS AND APPARATUS TO PROTECT CIRCUITRY FROM OVERCURRENT CONDITIONS

(71) Applicant: Texas Instruments Incorporated, Dallas, TX (US)

(72) Inventors: Supriyo Palit, Kolkata (IN); Arthur Brown, Richardson, TX (US); Mohammad Atiqur Rahman, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 400 days.

(21) Appl. No.: 18/379,555

(22) Filed: Oct. 12, 2023

(65) Prior Publication Data

US 2024/0136809 A1 Apr. 25, 2024
US 2024/0235185 A9 Jul. 11, 2024

Related U.S. Application Data

(60) Provisional application No. 63/418,113, filed on Oct. 21, 2022.

(51) Int. Cl.
*H02H 9/02* (2006.01)
*H04R 3/00* (2006.01)
*H04R 17/00* (2006.01)

(52) U.S. Cl.
CPC ............... *H02H 9/02* (2013.01); *H04R 3/007* (2013.01); *H04R 17/00* (2013.01)

(58) Field of Classification Search
CPC .......... H02H 9/02; H04R 3/007; H04R 17/00; H03F 2200/03; H03F 1/52; H03F 3/181; H03G 5/00
See application file for complete search history.

(56) References Cited

U.S. PATENT DOCUMENTS 11,457,311 B1 * 9/2022 Carbo .................... H04R 3/002
11,503,404 B1 * 11/2022 Hernandez ................ H03F 1/34
2012/0154032 A1 * 6/2012 Lesso ...................... H03F 3/181 330/109
2012/0154037 A1 * 6/2012 Pfaffinger ............. H03G 7/007 330/129
2013/0251164 A1 * 9/2013 Gautama ................ H04R 3/007 381/59
2014/0146971 A1 * 5/2014 Marguery ............. H04R 3/007 381/55
2014/0254804 A1 * 9/2014 Su ......................... H04R 3/007 381/55

(Continued)

FOREIGN PATENT DOCUMENTS

GB 2626614 A * 7/2024 ........... H03F 1/0233

*Primary Examiner* — Dharti H Patel
(74) *Attorney, Agent, or Firm* — Xianghui Huang; Frank D. Cimino

(57) ABSTRACT

An example apparatus includes: programmable circuitry configured to execute machine-readable instructions to: receive first voltages representative of an input signal; receive second voltages and currents, the second voltages and currents representative of voltages and currents of filter circuitry responsive to the first voltages; and determine a transfer function based on the first voltages and the second voltages and currents, the transfer function having coefficients representing the filter circuitry.

18 Claims, 12 Drawing Sheets

(56) References Cited

U.S. PATENT DOCUMENTS

2015/0010168 A1* 1/2015 Cheng .................... H04R 3/007 381/107
2017/0325024 A1* 11/2017 Hu ......................... H04R 3/007
2019/0182589 A1* 6/2019 Palit ........................ H03F 3/187
2019/0230438 A1* 7/2019 Hatab ..................... G10L 25/18
2021/0391702 A1* 12/2021 Yang ...................... H04R 17/00
2022/0216836 A1* 7/2022 Bandyopadhyay ... H03F 3/2175
2022/0225026 A1* 7/2022 Kou ....................... H04R 3/007
2023/0098806 A1* 3/2023 Xia ..................... H03F 3/45475 330/251

* cited by examiner

METHODS AND APPARATUS TO PROTECT CIRCUITRY FROM OVERCURRENT CONDITIONS

CROSS-REFERENCE TO RELATED APPLICATION

This patent application claims the benefit of and priority to U.S. Provisional Patent Application Ser. No. 63/418,113 filed Oct. 21, 2022, which is hereby incorporated herein by reference in its entirety.

TECHNICAL FIELD

This description relates generally to overcurrent protection and, more particularly, to methods and apparatus to protect circuitry from overcurrent conditions.

BACKGROUND

Electronic systems include protection circuitry to protect increasingly expensive and complex circuitry from hazardous operating conditions. One example of protection circuitry is overcurrent protection circuitry. Overcurrent protection circuitry monitors current supplied to a load for currents greater than a threshold current. When a current greater than the threshold current is identified, the overcurrent protection circuitry prevents circuitry from supplying the excessive current to the load.

SUMMARY

For methods and apparatus to protect circuitry from overcurrent conditions, an example apparatus includes programmable circuitry configured to execute machine-readable instructions to: receive first voltages representative of an input signal; receive second voltages and currents, the second voltages and currents representative of voltages and currents of filter circuitry responsive to the first voltages; and determine a transfer function based on the first voltages and the second voltages and currents, the transfer function having coefficients representing the filter circuitry.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
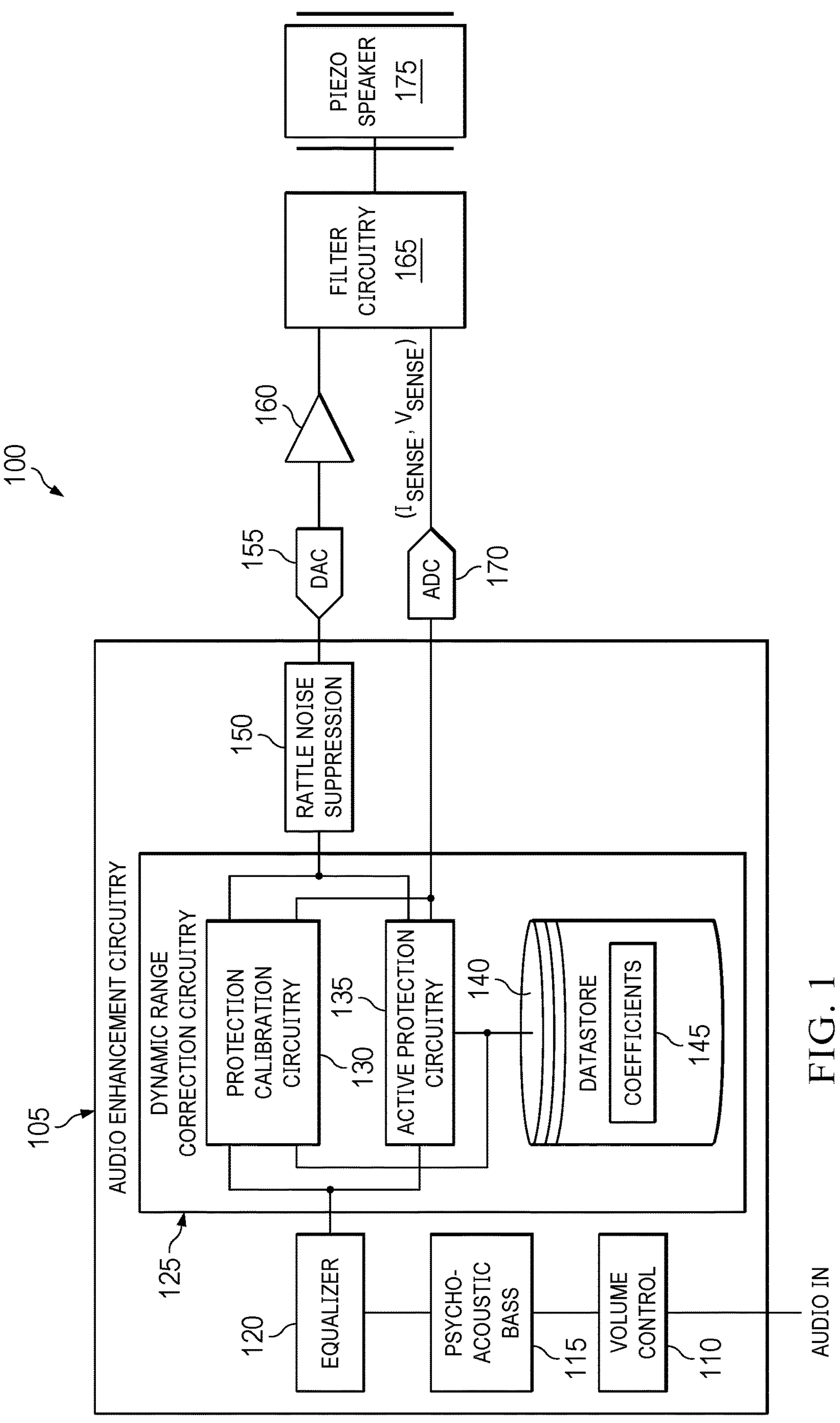
FIG. 1 is a block diagram of an example audio system implementing example dynamic range correction circuitry, including example protection calibration circuitry and example active protection circuitry, in example audio enhancement circuitry.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Electronic systems include protection circuitry to protect increasingly expensive and complex circuitry from hazardous operating conditions. One example of protection circuitry is overcurrent protection circuitry. Overcurrent protection circuitry monitors current supplied to a load to detect currents greater than a threshold current. When a current greater than the threshold current is identified, the overcurrent protection circuitry prevents circuitry from supplying the excessive current to the load.

In some devices, overcurrent protection circuitry determines whether an input signal to additional circuitry within the device may cause an overcurrent condition. The determination is made prior to the input signal being provided to the additional circuitry. Such overcurrent protection circuitry uses a mathematical model for some components in the device, referred to as a transfer function, to make such a determination. For example, the overcurrent protection circuitry uses equations to model the additional circuitry. The equations allow the protection circuitry to determine overcurrent conditions for a wide range of input signals. Designers may, a priori, empirically determine coefficients of the equations using assumed values of components of the circuitry being protected, resulting in a static model. However, during manufacture and run-time operation, tolerances and/or poor device performance due to age and temperature variation result in the assumed and static values of components being non-ideal. In such devices, variations in the assumed values of components decrease the accuracy of the equations that model the circuitry being protected. Devices that rely on assumed values of the circuitry being protected become increasingly susceptible to overcurrent as the inaccuracies in the circuitry being protected continue to increase over time.

Examples described herein include methods and apparatus to protect circuitry from overcurrent conditions using dynamically determined coefficients of a transfer function. For example, the coefficients are adjustable responsive to one or more signals provided to the circuitry being protected. In some described examples, protection circuitry uses coefficients of a transfer function to determine whether an input signal corresponds to overcurrent conditions. The coefficients form a transfer function that represents an impedance of filter circuitry and characteristics of an amplifier between the protection circuitry and an audio device (e.g., a speaker, line out, etc.). In example operations, the amplifier may be exposed to overcurrent conditions responsive to excessive decreases in the impedance of the filter circuitry. In such example operations, frequencies of an audio signal supplied to the amplifier may result in such excessive decreases. Advantageously, the protection circuitry uses the transfer function to determine impedances of the filter circuitry responsive to frequencies of audio signals. Advantageously, the protection circuitry corrects the audio signals to account for variations in the impedances of the filter circuitry.

During calibration operations of the protection circuitry, calibration circuitry determines the transfer function based on currents and voltages at circuitry coupled to an amplifier. For example, the calibration operations are performed during an initial tuning or configuration of the device, prior to active operations. The initial tuning or configuration may occur at manufacturing or during an initial device power-up by a user of the device. The currents and voltages of the circuitry coupled to the amplifier are responsive to supplying the input signal to the amplifier. During active operations of the protection circuitry, active protection circuitry uses the coefficients of the determined transfer function to estimate if a second input signal results in overcurrent conditions. The active protection circuitry is configured to limit the second input signal responsive to the detection of overcurrent conditions. Further, the active protection circuitry uses second currents and voltages of the filter circuitry to adjust the coefficients.

Advantageously, the protection circuitry determines the transfer function based on currents and voltages of the filter circuitry. Advantageously, the currents and voltages of the filter circuitry correspond to currents and voltages of a load, coupled to the filter circuitry. Advantageously, the currents and voltages of the filter circuitry account for components of the load. Advantageously, the protection circuitry uses coefficients of the determined transfer function to determine if input signals may cause overcurrent conditions. Advantageously, in accordance with some examples, the protection circuitry adjusts the coefficients based on subsequent currents and voltages of the filter circuitry.

FIG. 1 is a block diagram of an example audio system 100. In the example of FIG. 1, the audio system 100 includes example audio enhancement circuitry 105, an example digital-to-analog converter (DAC) 155, an example amplifier 160, example filter circuitry 165, an example analog-to-digital converter (ADC) 170, and an example speaker 175. The audio enhancement circuitry 105 includes example volume control circuitry 110, example psycho-acoustic bass circuitry 115, example equalizer circuitry 120, example dynamic range correction circuitry 125, and example rattle noise suppression circuitry 150. The Dynamic range correction circuitry 125 includes example protection calibration circuitry 130, example active protection circuitry 135, and an example datastore 140 that stores example coefficients 145.

The audio system 100 uses the dynamic range correction circuitry 125 to reduce the likelihood of the audio signal creating overcurrent conditions that may damage the amplifier 160. Although in the example of FIG. 1, the dynamic range correction circuitry 125 is implemented in the audio system 100, the dynamic range correction circuitry 125 may be implemented in alternative systems. For example, the speaker 175 may be replaced with alternative loads and/or one or more components of the audio enhancement circuitry 105 may be removed, modified, replaced, etc.

The audio enhancement circuitry 105 may be instantiated (e.g., creating an instance of, bring into being for any length of time, materialize, implement, etc.) by programmable circuitry such as a Central Processor Unit (CPU) executing first instructions. Additionally or alternatively, the audio enhancement circuitry 105 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. Thus, some or all of audio enhancement circuitry 105 may be instantiated at the same or different times. Also, some or all of audio enhancement circuitry 105 may be instantiated in one or more threads executing concurrently on hardware and/or in series on hardware. Moreover, some or all of audio enhancement circuitry 105 may be implemented by microprocessor circuitry executing instructions and/or FPGA circuitry performing operations to implement one or more virtual machines and/or containers. In a particular example, the audio enhancement circuitry 105 is implemented as a digital signal processor.

The audio enhancement circuitry 105 is coupled to the DAC 155, the ADC 170, and may be coupled to external circuitry that supplies audio data. In some examples, the audio data is a data stream. In other examples, the audio data is data stored in a memory. In the example of FIG. 1, the audio enhancement circuitry 105 receives audio data from external circuitry. The audio enhancement circuitry 105 performs a plurality of operations on the audio data to generate enhanced audio data. The operations of the audio enhancement circuitry 105 form an audio enhancement signal chain. The audio enhancement circuitry 105 supplies the enhanced audio data to the DAC 155.

The volume control circuitry 110 is coupled to the psycho-acoustic bass circuitry 115 and may be coupled to external circuitry that supplies the audio data. The volume control circuitry 110 controls a volume of the audio data. The volume of the audio data represents an intensity of sound output responsive to supplying a signal based on the audio data to the speaker 175. In some examples, the volume control circuitry 110 modifies the intensity of the audio data to adjust the volume of the corresponding sound. The volume control circuitry 110 supplies the volume adjusted audio data to the psycho-acoustic bass circuitry 115.

The psycho-acoustic bass circuitry 115 is coupled to the volume control circuitry and the equalizer circuitry 120. The psycho-acoustic bass circuitry 115 receives the volume adjusted audio data from the volume control circuitry 110. The psycho-acoustic bass circuitry 115 generates harmonics using the volume adjusted audio data. In some examples, the psycho-acoustic bass circuitry 115 generates harmonics to improve a perception of sound in a bass range of frequencies. In such examples, the psycho-acoustic bass circuitry 115 may remove sounds of the bass range of frequencies responsive to generating the harmonics. Advantageously, the psycho-acoustic bass circuitry 115 improves power efficiency by replacing the bass range of frequencies with harmonics. The psycho-acoustic bass circuitry 115 supplies the modified audio data to the equalizer circuitry 120.

The equalizer circuitry 120 is coupled to the psycho-acoustic bass circuitry 115 and the protection circuitries 130, 135. The equalizer circuitry 120 receives the modified audio data from the psycho-acoustic bass circuitry 115. In an example, the equalizer circuitry 120 is filter circuitry that adds a flat loudspeaker response and extension of the bass response to the modified audio data. The equalizer circuitry 120 supplies the modified audio data to the dynamic range correction circuitry 125 and the protection circuitries 130, 135.

The dynamic range correction circuitry 125 is coupled to the equalizer circuitry 120, the rattle noise suppression circuitry 150, and the ADC 170. In the example of FIG. 1, the dynamic range correction circuitry 125 includes the protection calibration circuitry 130, the active protection circuitry 135, and the datastore 140, which stores the coefficients 145. The dynamic range correction circuitry 125 receives the modified audio data from the equalizer circuitry 120. The dynamic range correction circuitry 125 determines a current of circuitry coupled to the amplifier 160 responsive to supplying the modified audio data to the amplifier 160. In the example of FIG. 1, the circuitry coupled to the amplifier 160 includes the filter circuitry 165 and the speaker 175. The dynamic range correction circuitry 125 modifies the audio data when the determined current corresponds to an overcurrent condition. The dynamic range correction circuitry 125 supplies the modified audio data to the rattle noise suppression circuitry 150.

The protection calibration circuitry 130 has a first input coupled to equalizer circuitry 120 and a second input coupled to the ADC 170. The protection calibration circuitry 130 has a first output coupled to the datastore 140. The protection calibration circuitry 130 has a second output coupled to the rattle noise suppression circuitry 150. The protection calibration circuitry 130 receives a calibration signal from the equalizer circuitry 120. In an example, the calibration signal is a test signal, e.g., chirp signal with a time-varying frequency, in which the frequency of the signal increases and/or decreases over time. In another example, the calibration signal is an audio signal. The protection calibration circuitry 130 supplies the calibration signal to the amplifier 160, by the DAC 155. The protection calibration circuitry 130 receives values representing sense voltages and sense currents of the filter circuitry 165, by the ADC 170, responsive to supplying the calibration signal. The protection calibration circuitry 130 correlates voltages of the calibration signal to sense voltages and sense currents of the filter circuitry 165.

The protection calibration circuitry 130 determines a transfer function representative of electrical characteristics of the amplifier 160, the filter circuitry 165, and the speaker 175. In FIG. 1, the dynamic range correction circuitry 125 is configured to protect the amplifier 160, the filter circuitry 165, and the speaker 175. In some examples, the protection calibration circuitry 130 fits the correlated voltages and currents to a transfer function. In such examples, the protection calibration circuitry 130 may select a nearest fit of the transfer function from a plurality of pre-defined transfer functions. In other examples, the protection calibration circuitry 130 determines the transfer function based on the correlated voltages and currents. The protection calibration circuitry 130 stores coefficients of the determined transfer function as the coefficients 145 in the datastore 140.

The active protection circuitry 135 has a first input coupled to the equalizer circuitry 120. The active protection circuitry 135 has a second input coupled to the datastore 140. The active protection circuitry 135 has a third input coupled to the filter circuitry 165, via the ADC 170. The active protection circuitry 135 has an output coupled to the rattle noise suppression circuitry 150. The active protection circuitry 135 receives the audio data as an input signal from the equalizer circuitry 120. The active protection circuitry 135 receives (e.g., accesses, reads from, etc.) the coefficients 145 from the datastore 140. The active protection circuitry 135 receives the currents and voltages of the filter circuitry 165 from the ADC 170. When the input signal corresponds to overcurrent conditions, the active protection circuitry 135 supplies a modified input signal to the rattle noise suppression circuitry 150. In such examples, the active protection circuitry 135 generates the modified input signal by limiting the input signal to currents less than a current limit. When the input signal does not correspond to overcurrent conditions, the active protection circuitry 135 supplies, as the input signal to the rattle noise suppression circuitry 150, an unmodified signal from the equalizer circuitry 120.

The active protection circuitry 135 determines if supplying the input signal to the amplifier 160 would generate a current greater than the current limit. Such a current, greater than the current limit, is referred to as an overcurrent. Supplying such a input signal to the amplifier 160 may result in components of the amplifier 160 exceeding safe operating conditions. The amplifier may become damaged responsive to an exposure to conditions that exceed the safe operating conditions. In some examples, the active protection circuitry 135 delays supplying the input signal to the amplifier 160. In such examples, the delay allows for the active protection circuitry 135 to determine whether the input signal could generate an overcurrent.

The active protection circuitry 135 converts voltages of the input signal to currents of the input signal using the coefficients 145. The active protection circuitry 135 determines a peak current of the currents of the input signal. The active protection circuitry 135 compares the peak current to a current limit. When the peak current is greater than or equal to the current limit, the active protection circuitry 135 determines the input signal corresponds to an overcurrent. Following such a determination, the active protection circuitry 135 determines a gain to reduce the peak current to a value below the current limit. The active protection circuitry 135 modifies the input signal by the gain to limit currents generated responsive to the input signal. The active protection circuitry 135 supplies the modified input signal to the amplifier 160.

The active protection circuitry 135 receives values representing the sense currents and the sense voltages of the filter circuitry 165 from the ADC 170 responsive to supplying the input signal to the amplifier 160 by the DAC 155. The active protection circuitry 135 estimates the sense current based on the sense voltage and the coefficients 145. The active protection circuitry 135 compares the estimate of the sense current to the received sense current. The active protection circuitry 135 adjusts the coefficients 145 based on differences between the estimate of the sense current and the received sense current. In some examples, the active protection circuitry 135 adjusts the coefficients 145 of the datastore 140 responsive to determining adjusted values. Advantageously, the active protection circuitry 135 actively adjusts the coefficients 145 based on currents and voltages of the filter circuitry 165.

The datastore 140 is coupled to the protection calibration circuitry 130 and the active protection circuitry 135. In the example of FIG. 1, the datastore 140 stores the coefficients 145. Alternatively, the dynamic range correction circuitry 125 may be modified to store the coefficients 145 in an alternative memory medium, such as one or more registers, non-volatile memory, volatile memory, random access memory (RAM), etc.

The coefficients 145 correspond to a transfer function selected by the protection calibration circuitry 130. The coefficients 145 may be modified by the active protection circuitry 135 based on currents and voltages of the filter circuitry 165. The coefficients 145 allow the active protection circuitry 135 to determine the current supplied to the filter circuitry 165 and speaker 175 responsive to input voltages.

The rattle noise suppression circuitry 150 is coupled to the protection circuitries 130, 135 and the DAC 155. The rattle noise suppression circuitry 150 receives the modified audio data as the input signal from the protection circuitries 130, 135. The rattle noise suppression circuitry 150 suppresses mechanical noise resulting from resonance frequencies of the input signal. The rattle noise suppression circuitry 150 supplies the modified audio data to the DAC 155.

The DAC 155 has an input coupled to the rattle noise suppression circuitry 150 and an output coupled to the amplifier 160. The DAC 155 receives the modified audio data from the rattle noise suppression circuitry 150. The DAC 155 converts digital data of the modified audio data to corresponding analog values. The DAC 155 supplies the analog values as an input signal to the amplifier 160.

The amplifier 160 has an input coupled to DAC 155 and the active protection circuitry 135. The amplifier 160 has an output coupled to the filter circuitry 165. The amplifier 160 receives the modified input signal from the DAC 155. The amplifier 160 buffers the modified input signal to supply an output signal to the filter circuitry 165. In some examples, the amplifier 160 generates the output signal by increasing the drive strength of the modified input signal by increasing the current and/or voltage. In such examples, the amplifier 160 may be referred to as driver circuitry. In other examples, the amplifier 160 may amplify the modified input signal by a gain to generate the output signal.

The filter circuitry 165 has an input coupled to the amplifier 160. The filter circuitry 165 has a first output coupled to the speaker 175. The filter circuitry 165 has a second output coupled to the protection circuitries 130, 135, by the ADC 170. The filter circuitry 165 receives the output signal from the amplifier 160. The filter circuitry 165 filters frequencies of the output signal that are outside of a range of frequencies. In some examples, the filter circuitry 165 may be implemented as a bandpass filter.

As described in detail in connection with FIG. 2, the filter circuitry 165 may be a resistor, inductor, capacitor (RLC) filter. In example operation, an impedance of the filter circuitry 165 varies based on the frequency of the output signal. For example, the impedance of capacitive components of the filter circuitry 165 decreases as the frequency of the output signal increases. In such examples, a reduction of the impedance of the filter circuitry 165 may increase the current being supplied to the filter circuitry 165 by the amplifier 160. In such an example, the impedance of the filter circuitry 165 is considered frequency dependent.

The dynamic range correction circuitry 125 accounts for the frequency dependency of the filter circuitry 165 by using the transfer function implemented utilizing the coefficients 145 to estimate the current being supplied to the filter circuitry 165 by the amplifier 160. Advantageously, a transfer function of the coefficients 145 may characterize frequency dependent operations of impedances coupled to the amplifier 160, such as components of the filter circuitry 165 and/or the speaker 175.

The filter circuitry 165 supplies values representative of the sense voltages and the sense currents to the dynamic range correction circuitry 125. The sense voltages represent voltages of circuitry coupled to the amplifier 160. The sense currents represent currents supplied to the circuitry coupled to the amplifier 160 by the output signal. In the example of FIG. 1, the sense currents represent currents of filter circuitry 165 and the speaker 175. In some examples, the values representative of the sense currents may be one or more voltages of the filter circuitry 165. For example, the dynamic range correction circuitry 125 may use the voltage difference between the one or more voltages to determine the current flowing through a known component, such as a resistor. Such a method of current sensing may be referred to as in-line current sensing. An example implementation of the filter circuitry 165 is illustrated in FIG. 2, below.

The ADC 170 has inputs coupled to the filter circuitry 165 and outputs coupled to the protection circuitries 130, 135. The ADC 170 receives analog values representing the sense currents and voltages of the filter circuitry 165. The ADC 170 converts the analog values into digital values that represent the sense currents and voltages of the filter circuitry 165. In some examples, the ADC 170 generates first values that represent the sense voltages and second values that represent the sense currents. The ADC 170 supplies the digital values to the protection circuitries 130, 135.

The speaker 175 is coupled to the filter circuitry 165. The speaker 175 generates audible noise responsive to currents from the filter circuitry 165. In some examples, the speaker 175 generates a tactile response responsive to voltages from the filter circuitry 165. For example, supplying one or more voltages to actuate portions of the speaker 175. In such examples, the actuation provides a tactile indication to a user in contact with a surface coupled to the speaker 175. In the example of FIG. 1, the speaker 175 is a piezoelectric speaker. In some examples, the speaker 175 is a frequency-dependent speaker, such as a piezoelectric speaker. In such examples, the dynamic range correction circuitry 125 uses sense currents and sense voltages of the filter circuitry 165 and the speaker 175 to determine the coefficients 145. Advantageously, the dynamic range correction circuitry 125 decreases the likelihood of the amplifier 160 supplying an excessive current responsive to a decrease in an impedance of the speaker 175. Alternatively, the audio system 100 of FIG. 1 may be modified to supply currents from the filter circuitry 165 to an alternative load, such as a transducer.

Figure 2:
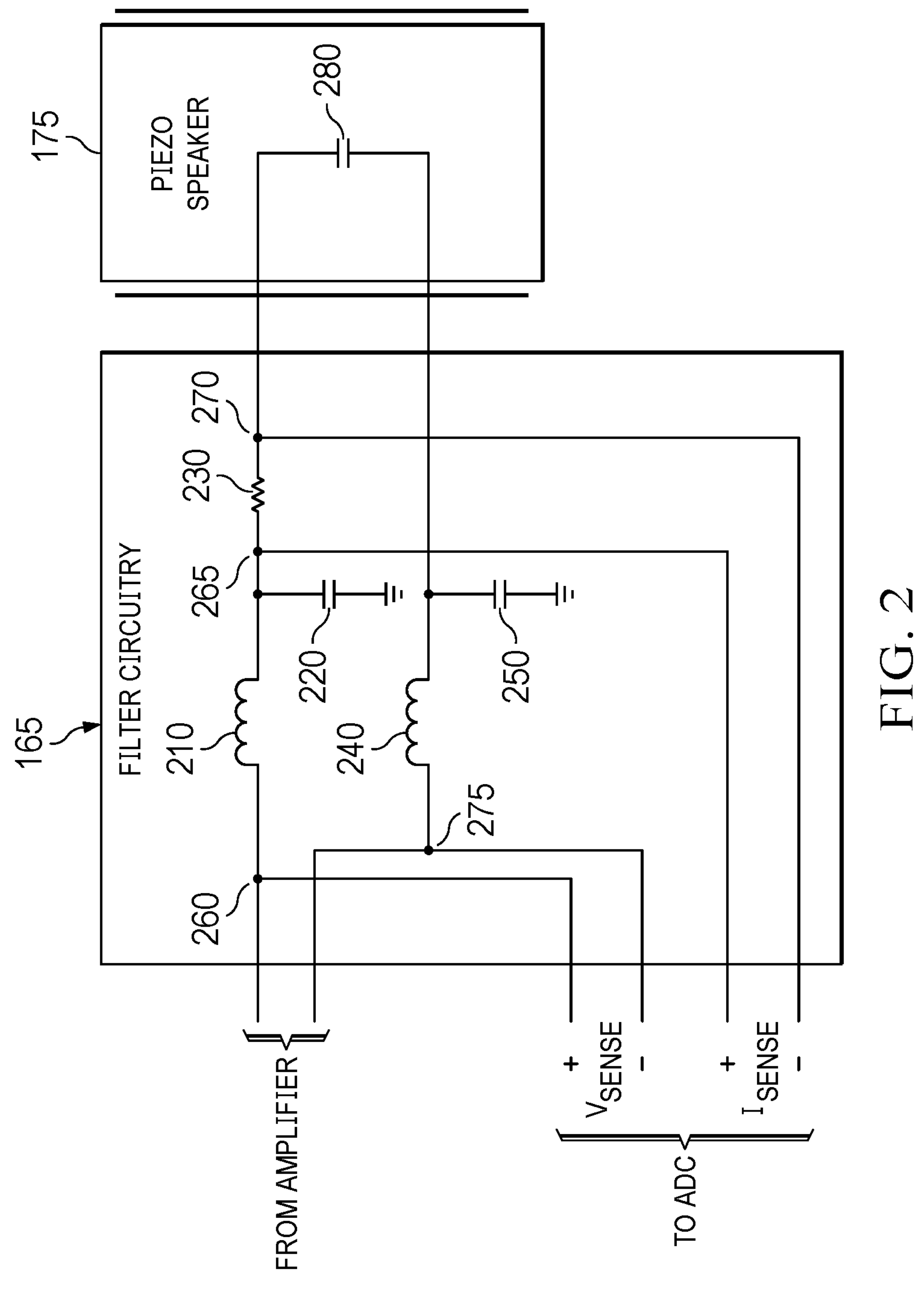
FIG. 2 is a schematic diagram of example filter circuitry and a load coupled to the protection circuitry and amplifier of FIG. 1.

FIG. 2 is a schematic diagram of an example of the filter circuitry 165 of FIG. 1 and the speaker 175 of FIG. 1. In the example of FIG. 2, the filter circuitry 165 includes a first example inductor 210, a first example capacitor 220, an example resistor 230, a second example inductor 240, a second example capacitor 250, a first example sense voltage terminal ($V_{SENSE+}$) 260, a first example sense current terminal ($I_{SENSE+}$) 265, a second example sense current terminal ($I_{SENSE-}$) 270, and a second example sense voltage terminal ($V_{SENSE-}$) 275. In the example of FIG. 2, the speaker 175 is modeled as a third example capacitor 280, which is an equivalent representation of an impedance of the speaker 175.

The first inductor 210 has a first terminal coupled to the first sense voltage terminal 260. The first terminal of the first inductor 210 is may be coupled to the amplifier 160 of FIG. 1 and the ADC 170 of FIG. 1. The first inductor 210 has a second terminal coupled to the first capacitor 220, the resistor 230, and the first sense current terminal 265. The second terminal of the first inductor 210 is may be coupled to the ADC 170 by the first sense current terminal 265. The first inductor 210 is a frequency dependent component of the filter circuitry 165. The impedance of the first inductor 210 increases as the frequency increases. The first inductor 210 filters relatively high frequency current changes. The impedance of the first inductor 210 increases responsive to relatively high frequency spikes in the current. In some examples, the increase in the impedance of the first inductor 210 prevents spikes in the current from being supplied to the speaker 175. In such examples, stored charges of the first inductor 210 resist the spike in currents from the amplifier 160.

The first capacitor 220 has a first terminal coupled to the first inductor 210, the resistor 230, and the first sense current terminal 265. The first capacitor 220 has a second terminal coupled to a common terminal that supplies a common potential (e.g., ground). The first capacitor 220 is a frequency dependent component of the filter circuitry 165. The impedance of the first capacitor 220 decreases as the frequency increases. The first capacitor 220 filters relatively high frequency noise. In some examples, the first capacitor 220 resists relatively high frequency changes in the voltage of the first terminal of the first capacitor 220. In such examples, charges stored by the first capacitor 220 are supplied and/or stored to counter the relatively high frequency noise. Such an example operation of the first capacitor 220 decreases electromagnetic interference (EMI).

The resistor 230 has a first terminal coupled to the first inductor 210, the first capacitor 220, and the first sense current terminal 265. The resistor 230 has a second terminal coupled to the third capacitor 280 and the second sense current terminal 270. The resistor 230 has a resistance ($R_S$). When supplied a current, the resistor 230 generates a voltage difference proportional to the resistance times the magnitude of the current. In such examples, the current through the resistor 230 may be determined by dividing the voltage difference by the resistance of the resistor 230. The impedance of the resistor 230 is not dependent on frequency. In some examples, the resistor 230 stabilizes the loop formed by the amplifier 160, the filter circuitry 165, and the speaker 175. In such examples, the resistance of the resistor 230 reduces the current being supplied the speaker 175. Alternatively, the filter circuitry 165 may be modified to include one or more additional resistors for one or more of detection of the current from the amplifier 160, stabilizing the loop formed by the amplifier 160, and/or limiting current through the filter circuitry 165.

The second inductor 240 has a first terminal coupled to the second sense voltage terminal 275. The first terminal of the second inductor 240 is may be coupled to the amplifier 160 and the ADC 170. The second inductor 240 has a second terminal coupled to the capacitors 250, 280. The second inductor 240 is a frequency dependent component of the filter circuitry 165. The impedance of the second inductor 240 increases as the frequency increases. The second inductor 240 filters relatively high frequency current changes. The impedance of the second inductor 240 increases responsive to relatively high frequency spikes in the current. In some examples, the increase in the impedance of the second inductor 240 prevents spikes in the current from being supplied to the speaker 175. In such examples, stored charges of the second inductor 240 resist spikes in the current from the amplifier 160.

The second capacitor 250 has a first terminal coupled to the second inductor 240 and the third capacitor 280. The second capacitor 250 has a second terminal coupled to the common terminal that supplies the common potential. The second capacitor 250 is a frequency dependent component of the filter circuitry 165. The impedance of the second capacitor 250 decreases as the frequency increases. The second capacitor 250 filters relatively high frequency noise. In some examples, the second capacitor 250 resists relatively high frequency changes in the voltage of the first terminal of the second capacitor 250. In such examples, charges stored by the second capacitor 250 are supplied and/or stored to counter the relatively high frequency noise. Such an example operation of the second capacitor 250 decreases EMI.

The sense voltage terminals 260, 275 may be coupled to the ADC 170. The sense voltage terminals 260, 275 represent the sense voltage ($V_{SENSE}$) of the filter circuitry 165.

The sense current terminals 265, 270 may be coupled to the ADC 170. The sense current terminals 265, 270 supply a reference voltage to the ADC 170. In the example of FIG. 2, the reference voltage represents the voltage difference across the resistor 230. The protection circuitry may determine the sense current value by dividing the voltage difference by the resistance of the resistor 230. Such a method of current sensing may be referred to as in-line current sensing. Alternatively, the sense current terminals 265, 270 may be modified to implement another method of current sensing. Alternatively, the filter circuitry 165 may be modified to include one or more additional resistors for one or more of detection of the current from the amplifier 160, stabilizing the loop formed by the amplifier 160, and/or limiting current through the filter circuitry 165. Also, the one or more additional resistors may be internal to the amplifier 160.

The third capacitor 280 has a first terminal coupled to the resistor 230 and the second sense current terminal 270. The third capacitor 280 has a second terminal coupled to the second inductor 240 and the second capacitor 250. In the example of FIG. 2, the third capacitor 280 is an equivalent representation of the speaker 175 when the speaker 175 is a piezoelectric speaker. Such an equivalence results from the impedance of the speaker 175 having a frequency dependency similar to that of a capacitor. In some examples, such as when the speaker 175 is an electromagnetic speaker, the speaker 175 may be illustrated by one or more alternative components.

Figure 3:
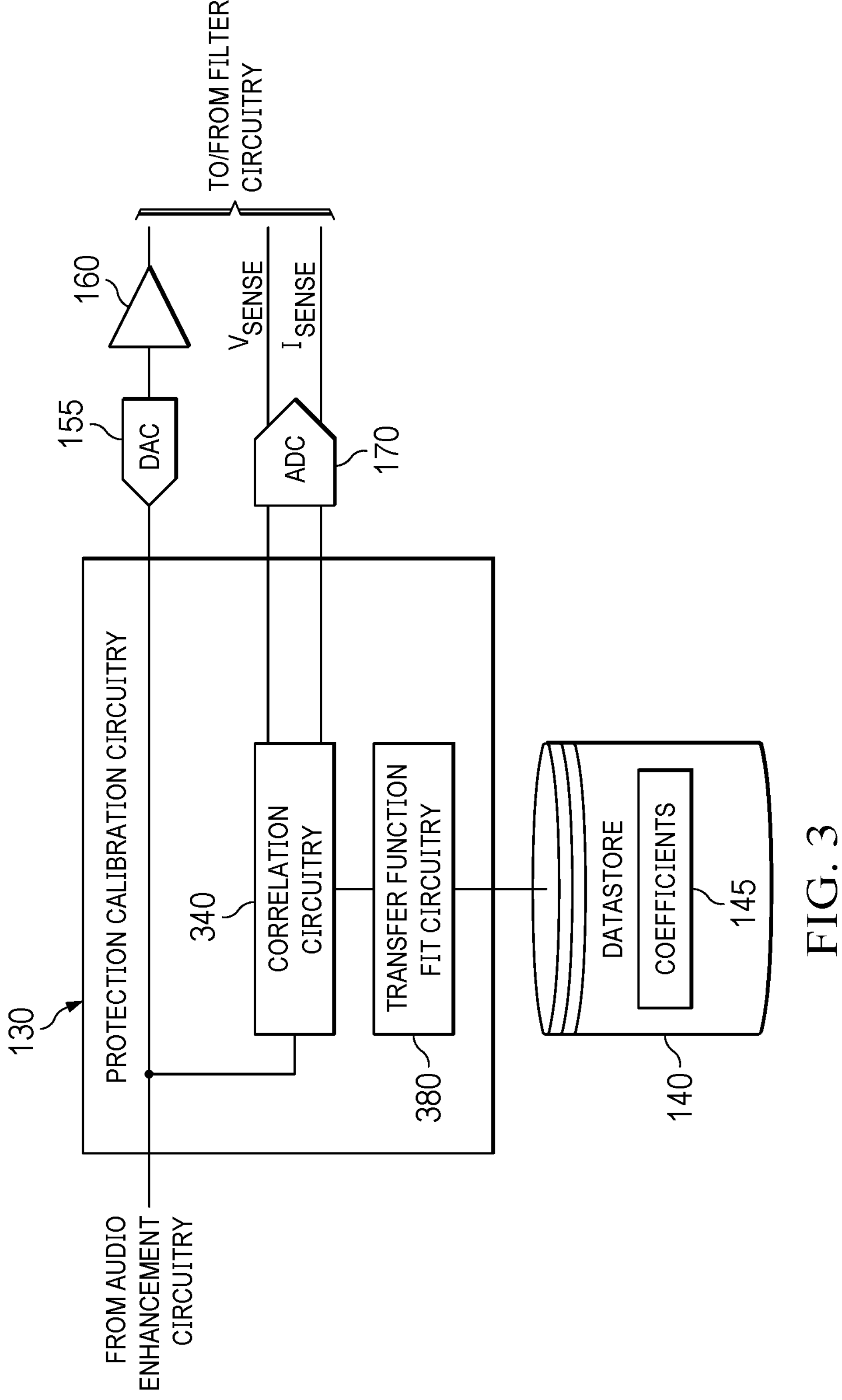
FIG. 3 is a block diagram of an example of the protection calibration circuitry of FIG. 1.

FIG. 3 is a block diagram of an example of the protection calibration circuitry 130 of FIG. 1. The protection calibration circuitry 130 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the protection calibration circuitry 130 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

In the example of FIG. 3, the protection calibration circuitry 130 includes example correlation circuitry 340 and example transfer function fit circuitry 380. The protection calibration circuitry 130 is configured to determine the coefficients 145 of FIG. 1 responsive to a calibration signal.

The correlation circuitry 340 has a first input coupled to the equalizer circuitry 120 of FIG. 1 and the amplifier 160 of FIG. 1. The correlation circuitry 340 has a second input and a third input coupled to the ADC 170 of FIG. 1. The correlation circuitry 340 receives the first values from the equalizer circuitry 120. The correlation circuitry 340 receives second values and third values from the ADC 170. In the example of FIG. 3, the second values represent the sense voltage of the filter circuitry 165 of FIGS. 1 and 2, while the third values represent the sense current of the filter circuitry 165. In some examples, the correlation circuitry 340 divides the third values by the resistance of the resistor 230 of FIG. 2 to determine the sense current.

The correlation circuitry 340 determines the second and third values that correspond to the first digital values. For example, the correlation circuitry 340 determines a set of second and third values that were generated responsive to supplying the input signal of the first values to the amplifier 160. In such an example, the second and third values are responsive to the first values. The correlation circuitry 340 determines a magnitude and phase of the filter circuitry 165 given the first values based on the corresponding second and third values. The correlation circuitry 340 supplies the magnitude and phase of the filter circuitry 165 given the first values to the transfer function fit circuitry 380. Advantageously, the correlation circuitry 340 may determine the magnitude and phase of the filter circuitry 165 across a range of input signal of different frequencies.

The transfer function fit circuitry 380 has an input coupled to the correlation circuitry 340. The transfer function fit circuitry 380 has an output coupled to the datastore 140 of FIG. 1. The transfer function fit circuitry 380 determines the magnitudes and phases of the filter circuitry 165 based on the input signal and the first and second values from the ADC 170. The transfer function fit circuitry 380 models admittance of circuitry coupled to the amplifier 160 based on the magnitudes and phases from the correlation circuitry 340. For example, the circuitry coupled to the amplifier 160 may include the filter circuitry 165 and the speaker 175. The transfer function fit circuitry 380 determines a transfer function (H(z)) that represents admittance of the circuitry coupled to the amplifier 160.

In some examples, the transfer function fit circuitry 380 approximates the filter operations of the circuitry coupled to the amplifier 160 as a second order recursive linear filter. In such examples, the transfer function fit circuitry 380 determines the transfer function by determining the coefficients 145 of the second order recursive linear filter. For example, the transfer function fit circuitry 380 determines coefficients of a second order impulse response using the magnitudes and phases of a frequency domain (Z-domain). In such an example, the transfer function fit circuitry 380 determines the coefficients ($a_0$, $a_1$, $a_2$, $b_0$, $b_1$, $b_2$) of the transfer function in the frequency domain (H (z)) Equation (1), below.

$$H(z) = \frac{b_0 + b_1 z^{-1} + b_2 z^{-2}}{a_0 + a_1 z^{1} + a_2 z^{2}}; \quad \text{Equation (1)}$$

Such a transfer function may be referred to as a bi-quad filter. Advantageously, the magnitudes and phases from the correlation circuitry 340 are in the frequency domain. Advantageously, coefficients determined using Equation (1), above, are the coefficients 145 of the transfer function. An example implementation of the coefficients 145 is described in connection with FIG. 4, below. Alternatively, the transfer function fit circuitry 380 may be modified to determine coefficients of an alternative type of filter.

In other examples, the transfer function fit circuitry 380 determines the transfer function by selecting a predetermined transfer function from a plurality of potential transfer functions. In such examples, the transfer function fit circuitry 380 may use the magnitudes and phases from the correlation circuitry 340 to select a best fit transfer function from a look up table (LUT). The transfer function fit circuitry 380 stores determined values of the coefficients 145 in the datastore 140.

Advantageously, the transfer function fit circuitry 380 determines the coefficients 145 using magnitudes and phases representative of the sense currents and sense voltages of the circuitry coupled to the amplifier 160. Advantageously, the transfer function fit circuitry 380 may use a plurality of magnitudes and phases of the sense currents and sense voltages with Equation (1), above, to determine the coefficients 145. Advantageously, the coefficients 145 represents example operations of circuitry coupled to the amplifier 160.

Figure 4:
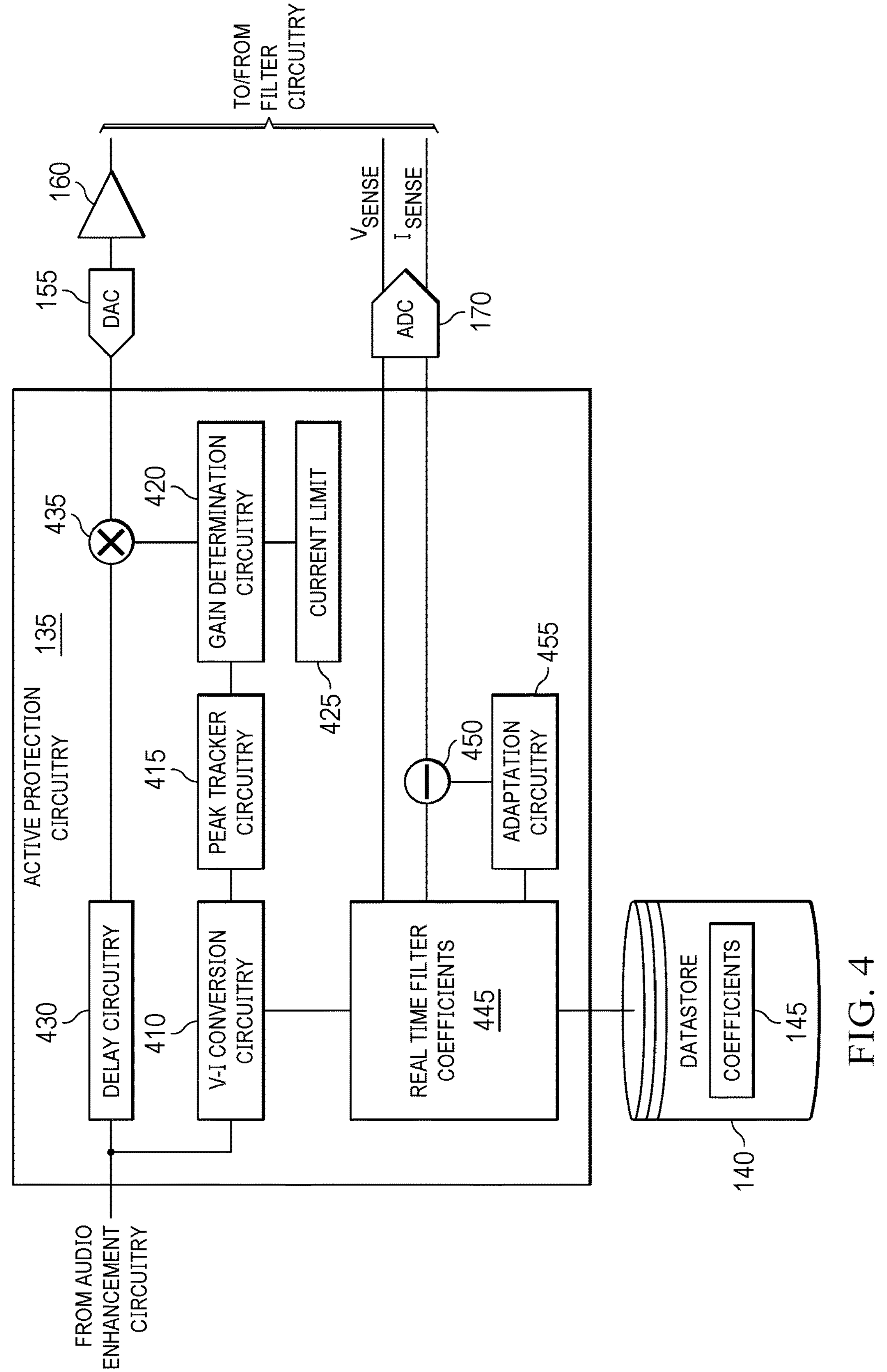
FIG. 4 is a block diagram of an example of the active protection circuitry of FIG. 1.

FIG. 4 is a block diagram of an example of the active protection circuitry 135 of FIG. 1. The active protection circuitry 135 of FIG. 4 may be instantiated (e.g., creating an instance of, bring into being for any length of time, materialize, implement, etc.) by programmable circuitry such as a Central Processor Unit (CPU) executing first instructions. Additionally or alternatively, the active protection circuitry 135 of FIG. 4 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 4 may, thus, be instantiated at the same or different times. Some or all of the circuitry of FIG. 4 may be instantiated, for example, in one or more threads executing concurrently on hardware and/or in series on hardware. Moreover, in some examples, some or all of the circuitry of FIG. 4 may be implemented by microprocessor circuitry executing instructions and/or FPGA circuitry performing operations to implement one or more virtual machines and/or containers.

In the example of FIG. 4, the active protection circuitry 135 includes example voltage-to-current (V-I) conversion circuitry 410, example peak tracker circuitry 415, example gain determination circuitry 420, an example current limit 425, example delay circuitry 430, example multiplication circuitry 435, example real-time filter (RTF) coefficients circuitry 445, example subtraction circuitry 450, and example adaptation circuitry 455.

The V-I conversion circuitry 410 has a first input coupled to the delay circuitry 430 and adaptive to be coupled to the equalizer circuitry 120 of FIG. 1. The V-I conversion circuitry 410 has a second input coupled to the RTF coefficients circuitry 445. The V-I conversion circuitry 410 has an output coupled to the peak tracker circuitry 415. The V-I conversion circuitry 410 receives first values, representing values of the input signal, from the audio source 105. The V-I conversion circuitry 410 receives real-time coefficients from the RTF coefficients circuitry 445. The real-time coefficients represent the coefficients 145 of FIGS. 1 and 3 that are adjusted during the operation of the active protection circuitry 135. In some examples, the real-time coefficients are initialized as the coefficients 145. In other examples, the coefficients 145 are updated to represent the real-time coefficients.

The V-I conversion circuitry 410 uses the real-time coefficients and the first values from the equalizer circuitry 120 to determine currents corresponding to the input signal. In some examples, the V-I conversion circuitry 410 uses one or more first values and determined currents to determine a current responsive to the input signal at a first time. For example, the V-I conversion circuitry 410 may determine the filter current at the first time (I[n]) using first values from the first time (V[n]), a second time (V[n−1]), and a third time (V[n−2]). The first values of the second time (V[n−1]) correspond to the first values from the audio source 105 previous to the first values of the first time (V[n]). The first values of the third time (V[n−2]) correspond to the first values, from the audio source 105 of FIG. 1, previous to the first values of the second time (V[n−1]). In such examples, the V-I conversion circuitry 410 also uses previously determined filter currents of the second time (I[n−1]) and the third time (I[n−2]) to determine the filter current at the first time (I[n]). In such examples, the V-I conversion circuitry 410 determines the filter current at the first time using Equation (2), below.

$$I[n] = \frac{b_0 V[n] + b_1 V[n-1] + b_2 V[n-2] - a_1 I[n-1] - a_2 I[n-2]}{a_0} \quad \text{Equation (2)}$$

Although in the example of FIG. 4, the real-time coefficients are utilized to determine the filter currents at three times, the V-I conversion circuitry 410 may be modified to determine the filter currents at any number of times. In such examples, the V-I conversion circuitry 410 may use a sliding window method to determine the filter currents at any given time. Alternatively, the V-I conversion circuitry 410 may be modified to implement an alternative method of using the real-time coefficients to determine the filter currents based on the input signal. For example, implementing an alternative to Equation (2), above. The V-I conversion circuitry 410 supplies filter current values representative of the filter currents at the first time, the second time, and the third time to the peak tracker circuitry 415.

The peak tracker circuitry 415 has an input coupled to the V-I conversion circuitry 410. The peak tracker circuitry 415 has an output coupled to the gain determination circuitry 420. The peak tracker circuitry 415 receives the filter current values from the V-I conversion circuitry 410. The peak tracker circuitry 415 compares the filter current values to determine a peak current value. The peak current value represents the largest filter current of the filter current values from the V-I conversion circuitry 410. In some examples, the peak tracker circuitry 415 is configured to redetermine the peak current after a plurality of filter current values. In such examples, the peak current represents the largest filter current for a given duration of time. The peak tracker circuitry 415 supplies the peak current value to the gain determination circuitry 420.

The gain determination circuitry 420 has a first input coupled to the peak tracker circuitry 415. The gain determination circuitry 420 has a second input coupled to the current limit 425. The gain determination circuitry 420 has an output coupled to the multiplication circuitry 435. The gain determination circuitry 420 receives the peak current value from the peak tracker circuitry 415. The gain determination circuitry 420 receives a current limit value from the current limit 425. The gain determination circuitry 420 determines a gain of the input signal based on the peak current value and the current limit value. The gain determination circuitry 420 compares the peak current value to the current limit value. When the peak current value is less than the current limit value, the gain determination circuitry 420 determines the gain to be one. When the peak current is greater than or equal to the current limit value, the gain determination circuitry 420 determines the gain to be the current limit value divided by the peak current value. The gain determination circuitry 420 supplies the gain and/or a gain value, representative of the gain, to the multiplication circuitry 435.

The current limit 425 is coupled to the gain determination circuitry 420. The current limit 425 stores the current limit value. The current limit value represents a maximum current that may be handled by the amplifier 160. In some examples, the current limit 425 is a memory device, such as one or more registers, memory location, etc. The current limit 425 supplies the current limit value to the gain determination circuitry 420.

The input of the delay circuitry 430 is coupled to the audio source 105. The delay circuitry 430 has an output coupled to the multiplication circuitry 435. The delay circuitry 430 receives the input signal from the equalizer circuitry 120. The delay circuitry 430 delays the input signal by a duration of time. The duration of time of the delay circuitry 430 is approximately equal to an amount of time needed for the V-I conversion circuitry 410, the peak tracker circuitry 415, and the gain determination circuitry 420, to determine the gain of the input signal. The delay circuitry 430 supplies the input signal to the multiplication circuitry 435 after the duration of time.

The multiplication circuitry 435 has a first input coupled to the gain determination circuitry 420. The multiplication circuitry 435 has a second input coupled to the delay circuitry 430. The multiplication circuitry 435 has an output that may be coupled to the amplifier 160 of FIG. 1. The multiplication circuitry 435 receives the gain value from the gain determination circuitry 420. The multiplication circuitry 435 receives the input signal from the delay circuitry 430. The multiplication circuitry 435 modifies the input signal by multiplying the input signal by the gain of the gain value. The multiplication circuitry 435 supplies the modified input signal to the amplifier 160.

The RTF coefficients circuitry 445 have a first input may be coupled to the datastore 140 of FIGS. 1 and 3. The RTF coefficients circuitry 445 has a second input coupled to the ADC 170 of FIG. 1. The RTF coefficients circuitry 445 has a third input coupled to the adaptation circuitry 455. The RTF coefficients circuitry 445 has a first output coupled to the V-I conversion circuitry 410. The RTF coefficients circuitry 445 has a second output coupled to the subtraction circuitry 450. The RTF coefficients circuitry 445 receives the coefficients 145 from the datastore 140. The RTF coefficients circuitry 445 receives the second values, representative of the sense voltage, from the ADC 170.

The RTF coefficients circuitry 445 initializes the real-time coefficients to be approximately equal to the coefficients 145. The RTF coefficients circuitry 445 allows the adaptation circuitry 455 to modify the real-time coefficients. The RTF coefficients circuitry 445 supplies the real-time coefficients to the V-I conversion circuitry 410. In some examples, the RTF coefficients circuitry 445 modifies and/or updates the datastore 140 to store the real-time coefficients as the coefficients 145.

The RTF coefficients circuitry 445 predicts the sense current at a first time based on the sense voltage at the first time and the real-time coefficients. The RTF coefficients circuitry 445 may predict the sense current similar to the determination of the filter current by the V-I conversion circuitry 410. In some examples, the RTF coefficients circuitry 445 uses one or more of the second values and determined sense currents to determine the sense current at a first time. For example, the RTF coefficients circuitry 445 may predict the sense current at the first time ($I_{PRED}$[n]) using second values from the first time ($V_{SENSE}$ [n]), a second time ($V_{SENSE}$ [n−1]), and a third time ($V_{SENSE}$ [n−2]). The second values of the second time ($V_{SENSE}$ [n−1]) correspond to the second values, from the ADC 170, previous to the second values of the first time ($V_{SENSE}$[n]). The second values of the third time ($V_{SENSE}$ [n−2]) correspond to the second values, from the second ADC 170, previous to the second values of the second time ($V_{SENSE}$ [n−1]). In such examples, the RTF coefficients circuitry 445 also uses previously predicted sense currents of the second time ($I_{PRED}$ [n−1]) and the third time ($I_{PRED}$[n−2]) to predict the sense current at the first time ($I_{PRED}$[n]). In such examples, the RTF coefficients circuitry 445 determines the sense current at the first time using Equation (3), below.

$$I_{PRED}[n] = \frac{b_0 V_{SENSE}[n] + b_1 V_{SENSE}[n-1] + b_2 V_{SENSE}[n-2] - a_1 I_{PRED}[n-1] - a_2 I_{PRED}[n-2]}{a_0} \quad \text{Equation (3)}$$

Although in the example of FIG. 4, the real-time coefficients are utilized to predict the sense currents using previous sense current predictions, the RTF coefficients circuitry 445 may be modified to predict the sense current using previous sense currents. In such examples, the RTF coefficients circuitry 445 may have another input coupled to the ADC 170 that is representative of the sense current. Alternatively, the RTF coefficients circuitry 445 may be modified to implement an alternative method of using the real-time coefficients to predict sense currents based on the sense voltage. For example, implementing an alternative to Equation (3), above. The RTF coefficients circuitry 445 supplies a predicted sense current value representing the predicted sense current to the subtraction circuitry 450.

The subtraction circuitry 450 has a first input coupled to the ADC 170. The subtraction circuitry 450 has a second input coupled to the RTF coefficients circuitry 445. The subtraction circuitry 450 has an output coupled to the adaptation circuitry 455. The subtraction circuitry 450 receives the second value representing the sense current from the ADC 170. The subtraction circuitry 450 receives the predicted sense current value from the RTF coefficients circuitry 445. The subtraction circuitry 450 determines an error value by subtracting the predicted sense current value from the second value. The error value represents a difference between the sense current and the predicted sense current. The subtraction circuitry 450 supplies the error value to the adaptation circuitry 455.

The adaptation circuitry 455 has an input coupled to the subtraction circuitry 450. The adaptation circuitry 455 has an output coupled to the RTF coefficients circuitry 445. The adaptation circuitry 455 receives the error value from the subtraction circuitry 450. The adaptation circuitry 455 adjusts (e.g., modifies, redetermines, etc.) the real-time coefficients of the RTF coefficients circuitry 445 based on the error value. Advantageously, the adaptation circuitry 455 reduces the error value by adjusting the real-time coefficients during operations of the filter circuitry 165 and speaker 175. Advantageously, the adaptation circuitry 455 may adjust the real-time coefficients to account for changes of circuitry coupled to the amplifier 160 over time.

Figure 5:
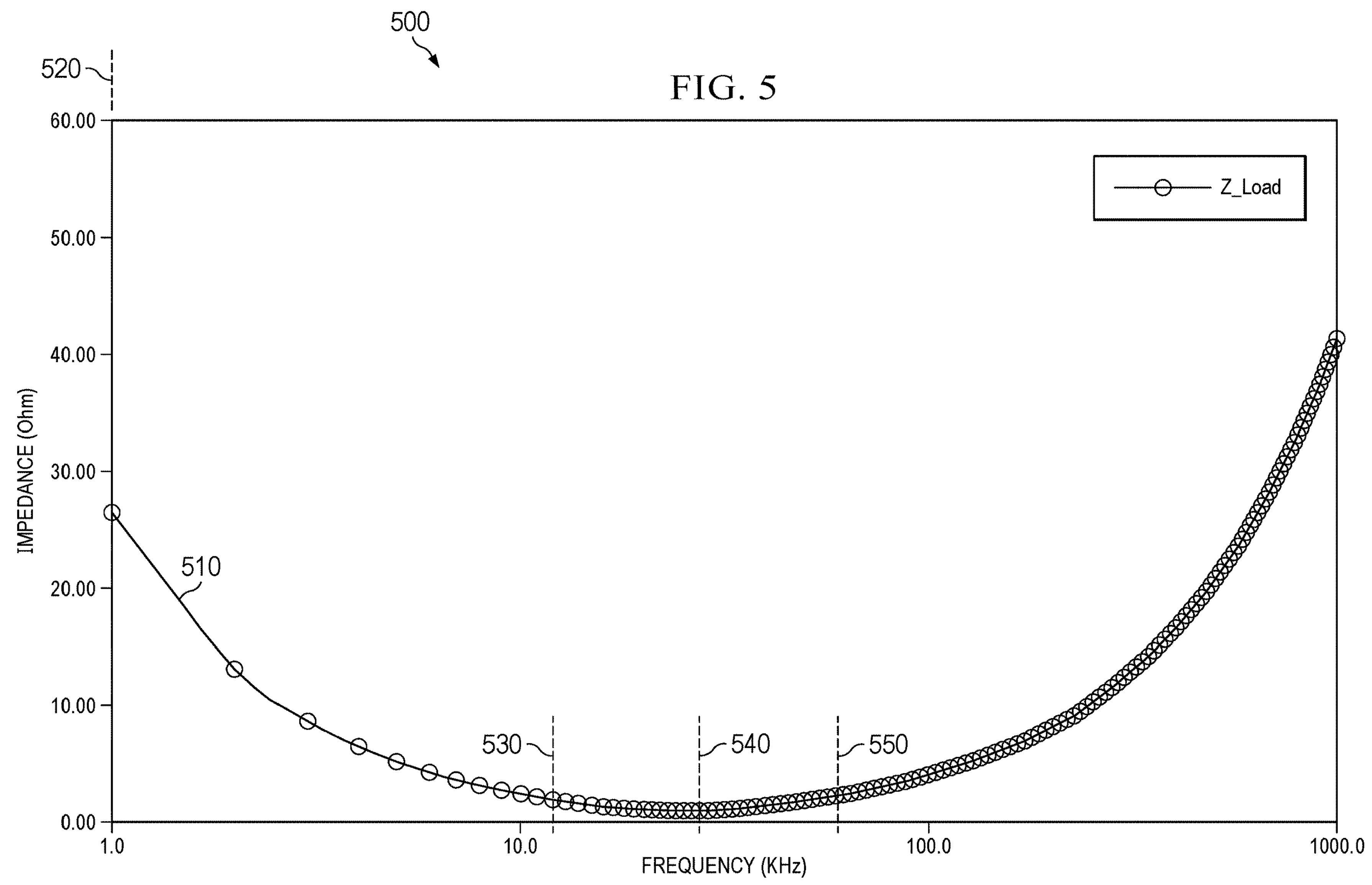
FIG. 5 is a plot of an example impedance of the filter circuitry of FIGS. 1 and 2.

FIG. 5 is a plot 500 of an example impedance (Z_Load) 510 of the circuitry coupled to the amplifier 160 of FIGS. 1, 3, and 5. In the example of FIG. 1, the filter circuitry 165 of FIGS. 1 and 2 and the speaker 175 of FIGS. 1 and 2 are the circuitry coupled to the amplifier 160. In the example of FIG. 5, the plot 500 illustrates the impedance 510 across a plurality of frequencies. The impedance 510 represents a total impedance of the circuitry coupled to the amplifier 160 when measured at the sense voltage terminals 260, 275.

At a first frequency 520, the impedance 510 is approximately 25 ohms (a). As the frequency of the input signal increases to a second frequency 530, the impedance 510 decreases. At a third frequency 540, the impedance 510 approaches zero ohms. Between the third frequency 540 and a fourth frequency 550, the impedance 510 begins to increase. Following the fourth frequency 550, the impedance 510 continues to increase.

Between the frequencies 530 and 550, the impedance 510 is relatively low. During such a range of frequencies, the amplifier 160 is susceptible to overcurrent conditions responsive to the relatively low magnitude of the impedance 510. In some examples, the impedance 510 limits the current supplied to the speaker 175 to a value less than the current limit 425 of FIG. 4 for a voltage of the input signal at the first frequency 520. However, the impedance 510 cannot limit the current supplied to the speaker 175 to a value less than the current limit 425 of FIG. 4 for the voltage of the input signal between the frequencies 530, 540, 550.

Advantageously, the active protection circuitry 135 of FIGS. 1 and 4 monitor the input signal for voltages at frequencies that may result in supplying a current greater than the current limit 425 to the speaker 175. Advantageously, the active protection circuitry 135 prevents excessive currents by modifying the input signal by a gain less than one. Advantageously, the active protection circuitry 135 actively modifies the real-time coefficients to account for variations in the impedance 510 over time.

Figure 6:
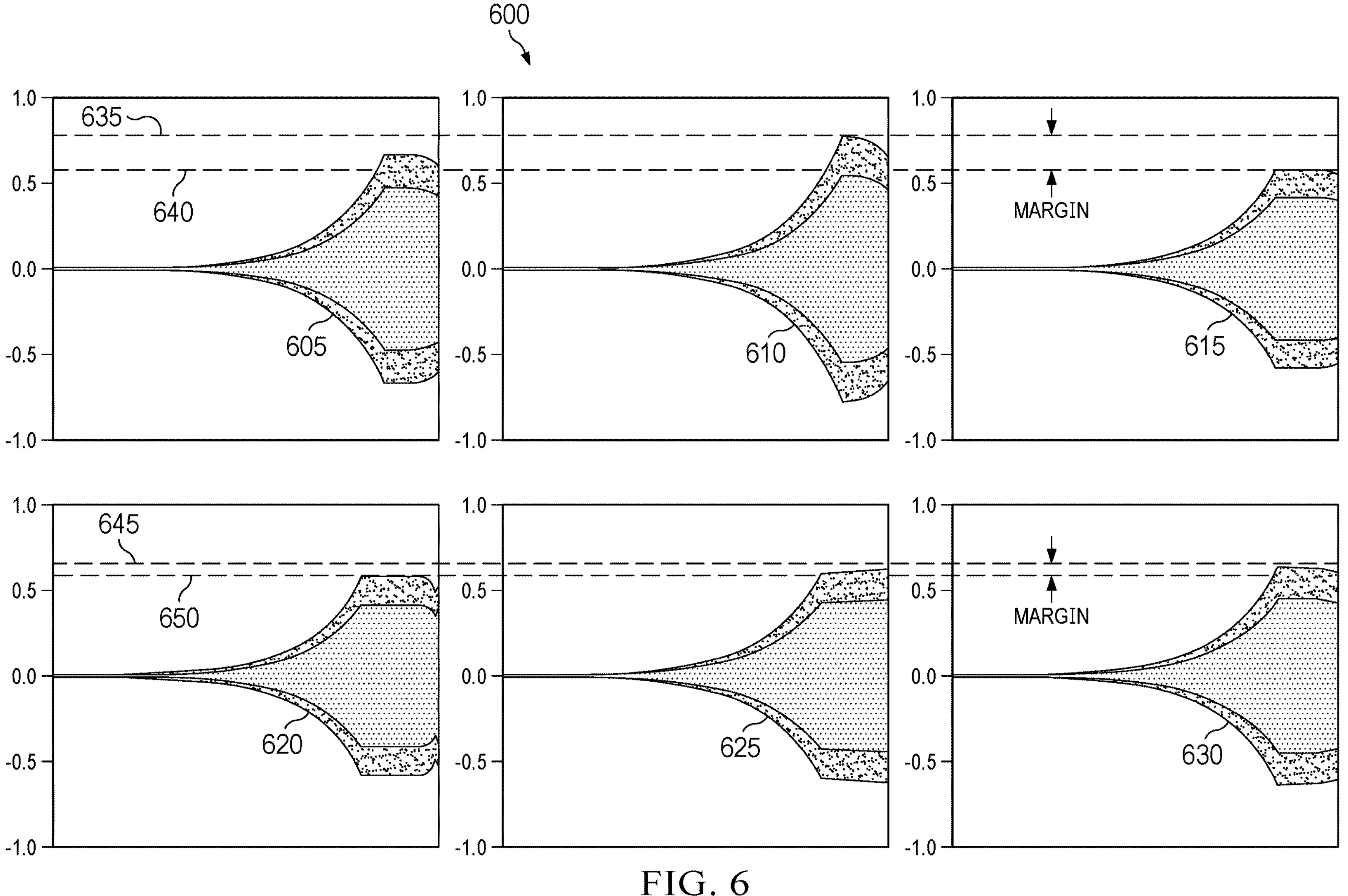
FIG. 6 is a diagram of example margins of the protection calibration circuitry of FIGS. 1 and 3.

FIG. 6 is a diagram 600 of example improvements when the protection calibration circuitry 130 of FIGS. 1 and 3 determines the coefficients 145 of FIGS. 1, 3, and 4. In the example of FIG. 6, the diagram 600 includes a first example nominal values plot 605, a second example nominal values plot 610, a third example nominal value plot 615, a first example calibration plot 620, a second example calibration plot 625, a third example calibration plot 630, a first example nominal margin 635, a second example nominal margin 640, a first example calibration margin 645, and a second example calibration margin 650.

The nominal values plots 605, 610, 615 illustrate the sense current across a range of voltages when coefficients used to detect overcurrent conditions are calculated. The first nominal values plot 605 illustrates the sense currents when the inductance of the inductors 210, 240 of FIG. 2 and the capacitance of the capacitors 220, 250 of FIG. 2 are nominal values. The second nominal values plot 610 illustrates the sense currents when the inductance of the inductors 210, 240 is decreased by ten percent while the capacitance of the capacitors 220, 250 are increased by ten percent. Such variations in the inductors 210, 240 and the capacitance of the capacitors 220, 250 are responsive to process variations during manufacture. The third nominal values plot 615 illustrates the sense currents when the inductance of the inductors 210, 240 is increased by ten percent while the capacitance of the capacitors 220, 250 are decreased by ten percent.

The calibration plots 620, 625, 630 illustrate the sense current across a range of voltages when coefficients used to detect overcurrent conditions are determined by the protection calibration circuitry 130. The first calibration plot 620 illustrates the sense currents when the inductance of the inductors 210, 240 and the capacitance of the capacitors 220, 250 is randomly selected from the possible values for a first time. The second calibration plot 625 illustrates the sense currents when the inductance of the inductors 210, 240 and the capacitance of the capacitors 220, 250 is randomly selected from the possible values for a second time. The third calibration plot 630 illustrates the sense currents when the inductance of the inductors 210, 240 and the capacitance of the capacitors 220, 250 is randomly selected from the possible values for a third time.

The nominal margins 635, 640 represent the possible range of currents supplied by the amplifier 160 for calculated coefficients. The calibration margins 645, 650 represent the possible range of currents supplied by the amplifier 160 when the coefficients 145 are determined using the protection calibration circuitry 130. Advantageously, the dynamic range correction circuitry 125 reduces a likelihood of overcurrent conditions in the amplifier 160 by decreasing currents greater than the current limit 425 of FIG. 4.

Figure 7A:
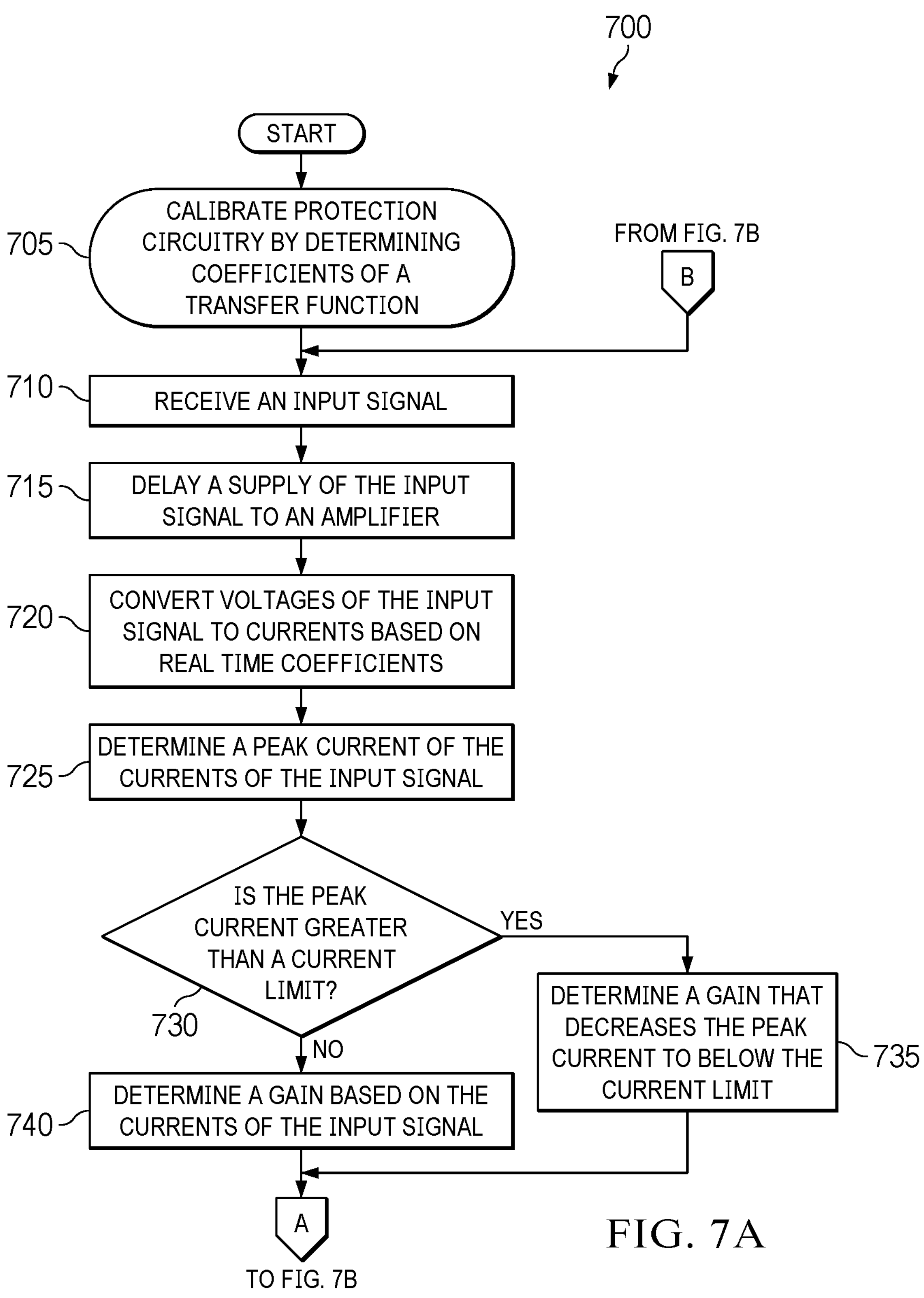
FIGS. 7A and 7B form a flowchart representative of example machine-readable instructions and/or example operations that may be executed, instantiated, and/or performed using an example programmable circuitry implementation of the protection calibration circuitry of FIGS. 1 and 3, the active protection circuitry of FIGS. 1 and 4, and/or more generally the protection circuitry of FIG. 1.
Figure 7B:
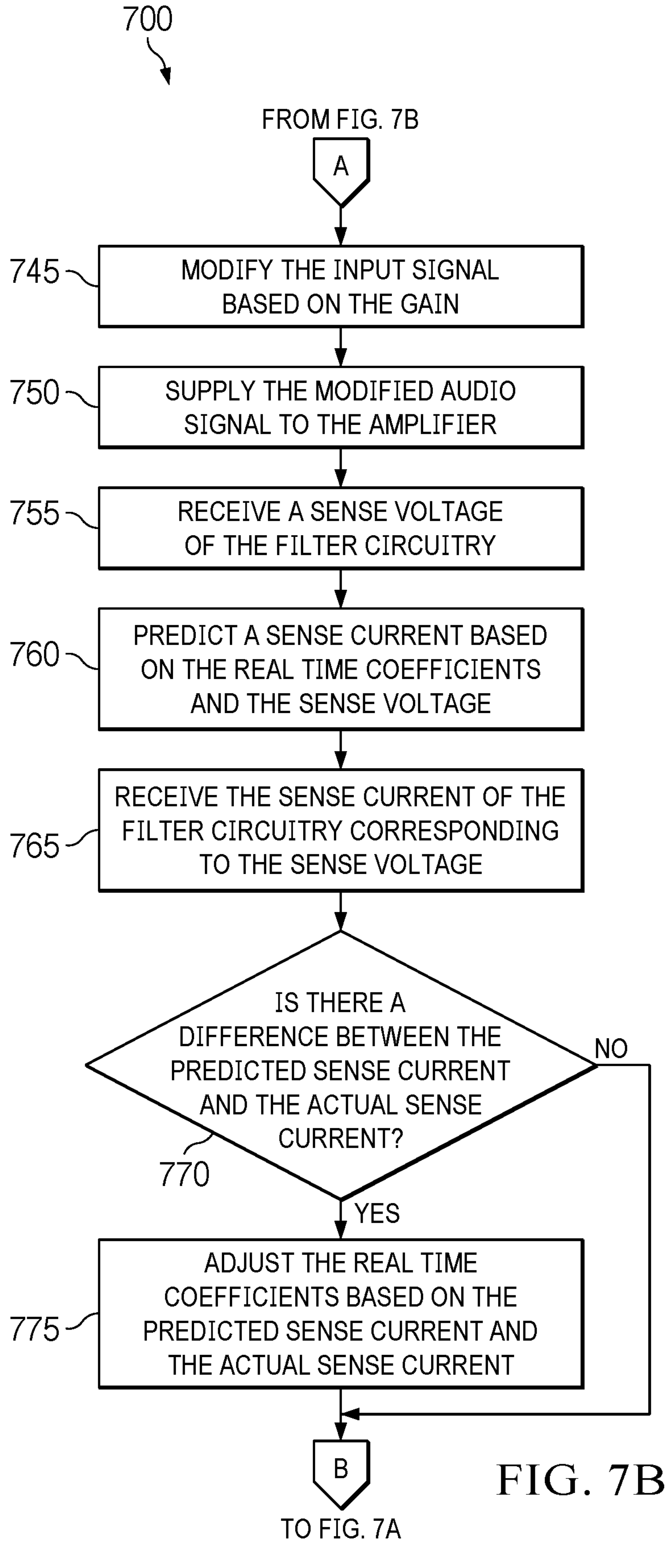

FIGS. 7A and 7B are a flowchart representative of example machine-readable instructions and/or example operations 700 that may be executed, instantiated, and/or performed using an example programmable circuitry implementation of the protection calibration circuitry 130 of FIGS. 1 and 3 and the active protection circuitry 135 of FIGS. 1 and 4 and/or more generally the dynamic range correction circuitry 125 of FIG. 1. The example machine-readable instructions and/or example operations 700 begin at Block 705, at which the protection calibration circuitry 130 calibrates the protection circuitry by determining coefficients of a transfer function. In some examples, the protection calibration circuitry 130 determines the coefficients 145 of FIGS. 1, 3, and 4 using sense currents and sense voltages of circuitry coupled to the amplifier 160 of FIGS. 1, 3, and 4. In such examples, the protection calibration circuitry 130 may use Equation (1), above, to determine the coefficients 145. The operations of Block 705 are further described in FIG. 8, below.

The active protection circuitry 135 receives an input signal. (Block 710). In some examples, the V-I conversion circuitry 410 of FIG. 4 and the delay circuitry 430 of FIG. 4 receive values of an input signal, such as an audio signal.

The delay circuitry 430 delays a supply of the input signal to an amplifier. (Block 715). In some examples, the delay circuitry 430 delays the supply of the input signal to the amplifier 160 of FIG. 1 by a duration of time. In such examples, the duration of time allows the V-I conversion circuitry 410, the peak tracker circuitry 415 of FIG. 4, and the gain determination circuitry 420 of FIG. 4 time to determine a gain of the input signal.

The V-I conversion circuitry 410 converts voltages of the input signal to currents based on real-time coefficients. (Block 720). In some examples, the V-I conversion circuitry 410 receives the real-time coefficients from the RTF coefficients circuitry 445 of FIG. 4. In such examples, the V-I conversion circuitry 410 uses Equation (2), above, to determine currents responsive to the input signal.

The peak tracker circuitry 415 determines a peak current of the currents of the input signal. (Block 725). In some examples, the peak tracker circuitry 415 determines the peak current value by comparing the current values from the V-I conversion circuitry 410. In such examples, the peak tracker circuitry 415 may redetermine the peak current value after a plurality of current values from the V-I conversion circuitry 410.

The gain determination circuitry 420 determines if the peak current is greater than a current limit. (Block 730). In some examples, the gain determination circuitry 420 compares the peak current value from the peak tracker circuitry 415 to the current limit value from the current limit 425 of FIG. 4.

If the gain determination circuitry 420 determines that the peak current is greater than the current limit (e.g., Block 730 returns a result of YES), the gain determination circuitry 420 determines a gain that decreases the peak current to below the current limit. (Block 735). In some examples, the gain determination circuitry 420 determines the gain by dividing the current limit value by the peak current value. In such an example, the determined gain scales down the input voltage responsive to the gain being less than one.

If the gain determination circuitry 420 determines that the peak current is not greater than the current limit (e.g., Block 730 returns a result of NO), the gain determination circuitry 420 determines a gain based on the currents of the input signal. (Block 740). In some examples, the gain determination circuitry 420 determines the gain to be one when the peak current value is less than the current limit value.

Turning now to FIG. 7B, the multiplication circuitry 435 of FIG. 4 modifies the input signal by the gain. (Block 745). In some examples, the multiplication circuitry 435 multiplies the input signal by the gain.

The multiplication circuitry 435 supplies the modified input signal to the amplifier. (Block 750). In some examples, the multiplication circuitry 435 supplies the modified input signal to the amplifier 160.

The ADC 170 of FIGS. 1, 3, and 4 receives a sense voltage of the filter circuitry. (Block 755). In some examples, the ADC 170 converts the sense voltage of the filter circuitry 165 and speaker 175 of FIGS. 1 and 2 to a second value. In such examples, the ADC 170 supplies the second value to the RTF coefficients circuitry 445.

The RTF coefficients circuitry 445 predicts a sense current based on the real-time coefficients and the sense voltage. (Block 760). In some examples, the RTF coefficients circuitry 445 uses Equation (3), above, and the sense voltage from the ADC 170 to predict the sense current of the filter circuitry 165 and speaker 175.

The ADC 170 of FIG. 4 receives a sense current of the filter circuitry 165 and speaker 175 corresponding to the sense voltage. (Block 765). In some examples, the ADC 170 converts the sense current of the filter circuitry 165 and speaker 175 to a third value. In such examples, the ADC 170 supplies the third value to the subtraction circuitry 450 of FIG. 4.

The subtraction circuitry 450 determines if there is a difference between the predicted sense current and the actual sense current. (Block 770). In some examples, the subtraction circuitry 450 subtracts the sense current from the ADC 170 from the predicted sense current from the RTF coefficients circuitry 445. In such examples, the subtraction circuitry 450 supplies the difference to the adaptation circuitry 455 of FIG. 4. In other examples, the subtraction circuitry 450 determines if there is a difference greater than a threshold value. In such examples, the threshold represents a range of acceptable predictions.

If the subtraction circuitry 450 determines there is a difference between the predicted sense current and the actual sense current (e.g., Block 770 returns a result of YES), the adaptation circuitry 455 adjusts the real-time coefficients based on the predicted sense current and the actual sense current. (Block 775). In some examples, the adaptation circuitry 455 adjusts the real-time coefficients of the RTF coefficients circuitry 445 based on the difference from the subtraction circuitry 450. If the subtraction circuitry 450 determines there is not a difference between the predicted sense current and the actual sense current (e.g., Block 770 returns a result of NO), control proceeds to return to Block 710 of FIG. 7A.

Although example methods are described with reference to the flowchart illustrated in FIGS. 7A and 7B, many other methods of implementing the dynamic range correction circuitry 125 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 8:
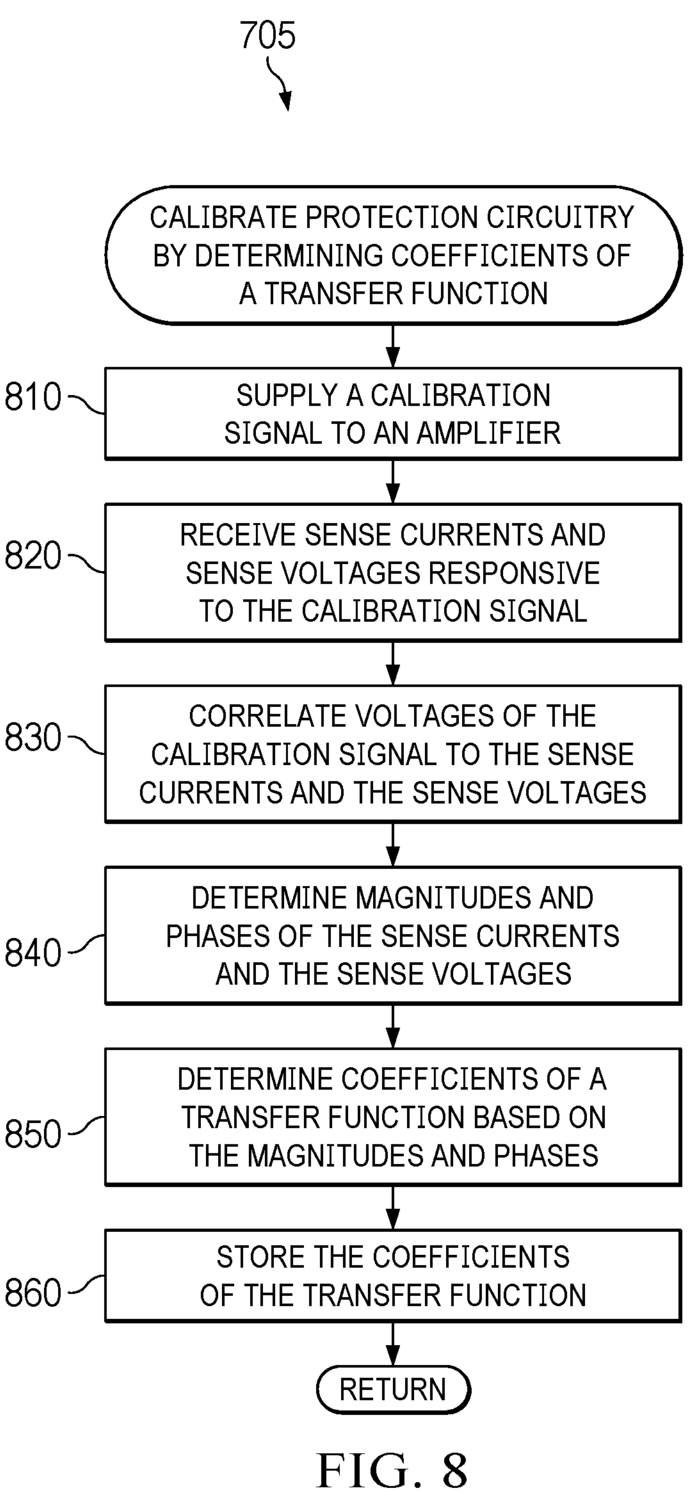
FIG. 8 is a flowchart representative of example machine-readable instructions and/or example operations that may be executed, instantiated, and/or performed using an example programmable circuitry implementation of the protection calibration circuitry of FIGS. 1 and 3.

FIG. 8 is a flowchart representative of example machine-readable instructions and/or example operations 705 that may be executed, instantiated, and/or performed using an example programmable circuitry implementation of the protection calibration circuitry 130 of FIGS. 1 and/or more generally the dynamic range correction circuitry 125 of FIG. 1. The example machine-readable instructions and/or example operations 705 begin at Block 810, at which the protection calibration circuitry 130 supplies a calibration signal to an amplifier. In some examples, the protection calibration circuitry 130 supplies a plurality of input signals of different frequencies to the amplifier 160. In such examples, the input signals of different frequencies are the calibration signal.

The ADC 170 of FIGS. 1, 3, and 4 receives sense currents and sense voltages responsive to the calibration signal. (Block 820). In some examples, the ADC 170 converts the sense voltage of the filter circuitry 165 and speaker 175 of FIGS. 1 and 2 to a second value, while the ADC 170 converts the sense current of the filter circuitry 165 to a third value. In such examples, the ADC 170 supplies the second and third values to the correlation circuitry 340 of FIG. 3.

The correlation circuitry 340 correlates voltage of the calibration signal to the sense currents and the sense voltage. (Block 830). In some examples, the correlation circuitry 340 determines input voltages of the calibration signal that correspond to sense voltages and sense currents of the filter circuitry 165 and speaker 175. For example, the correlation circuitry 340 correlates a first voltage of the input signal to a first sense current and a first sense voltage. In such an example, the first sense current and the first sense voltage are responsive to supplying the first voltage of the input signal to the amplifier 160.

The correlation circuitry 340 determines magnitudes and phases of the sense currents and the sense voltages. (Block 840). In some examples, the correlation circuitry 340 determines frequency domain coordinates of the filter circuitry 165 and speaker 175 based on the sense currents and the sense voltages.

The transfer function fit circuitry 380 of FIG. 3 determines coefficients of a transfer function based on the magnitudes and phases. (Block 850). In some examples, the transfer function fit circuitry 380 uses Equation (1), above, and the magnitudes and phases of the sense currents and the sense voltage to determine the coefficients 145 of FIGS. 1, 3, and 4.

The transfer function fit circuitry 380 stores the coefficients of the transfer function. (Block 860). In some examples, the transfer function fit circuitry 380 stores the coefficients 145 of the transfer function to the datastore 140 of FIGS. 1, 3, and 4. Control proceeds to return.

Although example methods are described with reference to the flowchart illustrated in FIG. 8, many other methods of implementing the protection calibration circuitry may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

While an example manner of implementing the dynamic range correction circuitry 125 of FIG. 1 is illustrated in FIG. 1, one or more of the elements, processes, and/or devices illustrated in FIG. 1 may be combined, divided, re-arranged, omitted, eliminated, and/or implemented in any other way. Further, the volume control circuitry 110 of FIG. 1, the psycho-acoustic bass circuitry 115 of FIG. 1, the equalizer circuitry 120 of FIG. 1, the rattle noise suppression circuitry 150 of FIG. 1, the correlation circuitry 340 of FIG. 3, the transfer function fit circuitry 380 of FIG. 3, the V-I conversion circuitry 410 of FIG. 4, the peak tracker circuitry 415 of FIG. 4, the gain determination circuitry 420 of FIG. 4, the delay circuitry 430 of FIG. 4, the multiplication circuitry 435 of FIG. 4, the RTF coefficients circuitry 445 of FIG. 4, the adaptation circuitry 455 of FIG. 4, the subtraction circuitry 450 of FIG. 4, and/or, more generally the protection calibration circuitry 130 of FIGS. 1 and 3 and/or the active protection circuitry 135 of FIGS. 1 and 4 and/or the example dynamic range correction circuitry 125 of FIG. 1, may be implemented by hardware alone or by hardware in combination with software and/or firmware. Thus, for example, any of the volume control circuitry 110 of FIG. 1, the psycho-acoustic bass circuitry 115 of FIG. 1, the equalizer circuitry 120 of FIG. 1, the rattle noise suppression circuitry 150 of FIG. 1, the correlation circuitry 340 of FIG. 3, the transfer function fit circuitry 380 of FIG. 3, the V-I conversion circuitry 410 of FIG. 4, the peak tracker circuitry 415 of FIG. 4, the gain determination circuitry 420 of FIG. 4, the delay circuitry 430 of FIG. 4, the multiplication circuitry 435 of FIG. 4, the RTF coefficients circuitry 445 of FIG. 4, the adaptation circuitry 455 of FIG. 4, the subtraction circuitry 450 of FIG. 4, and/or, more generally the protection calibration circuitry 130 of FIGS. 1 and 3 and/or the active protection circuitry 135 of FIGS. 1 and 4 and/or, even more generally, the example dynamic range correction circuitry 125 of FIG. 1, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example dynamic range correction circuitry 125 of FIG. 1 may include one or more elements, processes, and/or devices in addition to, or instead of, those illustrated in FIG. 1, and/or may include more than one of any or all of the illustrated elements, processes and devices.

Flowchart(s) representative of example machine-readable instructions, which may be executed by programmable circuitry to implement and/or instantiate the dynamic range correction circuitry 125 of FIG. 1 and/or representative of example operations which may cause programmable circuitry to implement and/or instantiate the dynamic range correction circuitry 125 of FIG. 1, are shown in FIGS. 7A, 7B, 8. The machine-readable instructions may be one or more executable programs or portion(s) of one or more executable programs for execution by programmable circuitry such as the programmable circuitry 912 shown in the example programmable platform 900 described below in connection with FIG. 9 and/or may be one or more function(s) or portion(s) of functions to be performed by the example programmable circuitry (e.g., an FPGA) described below in connection with FIGS. 10 and/or 11. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 7A, 7B, 8, many other methods of implementing the example dynamic range correction circuitry 125 of FIG. 1 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 7A, 7B, 8 may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 9:
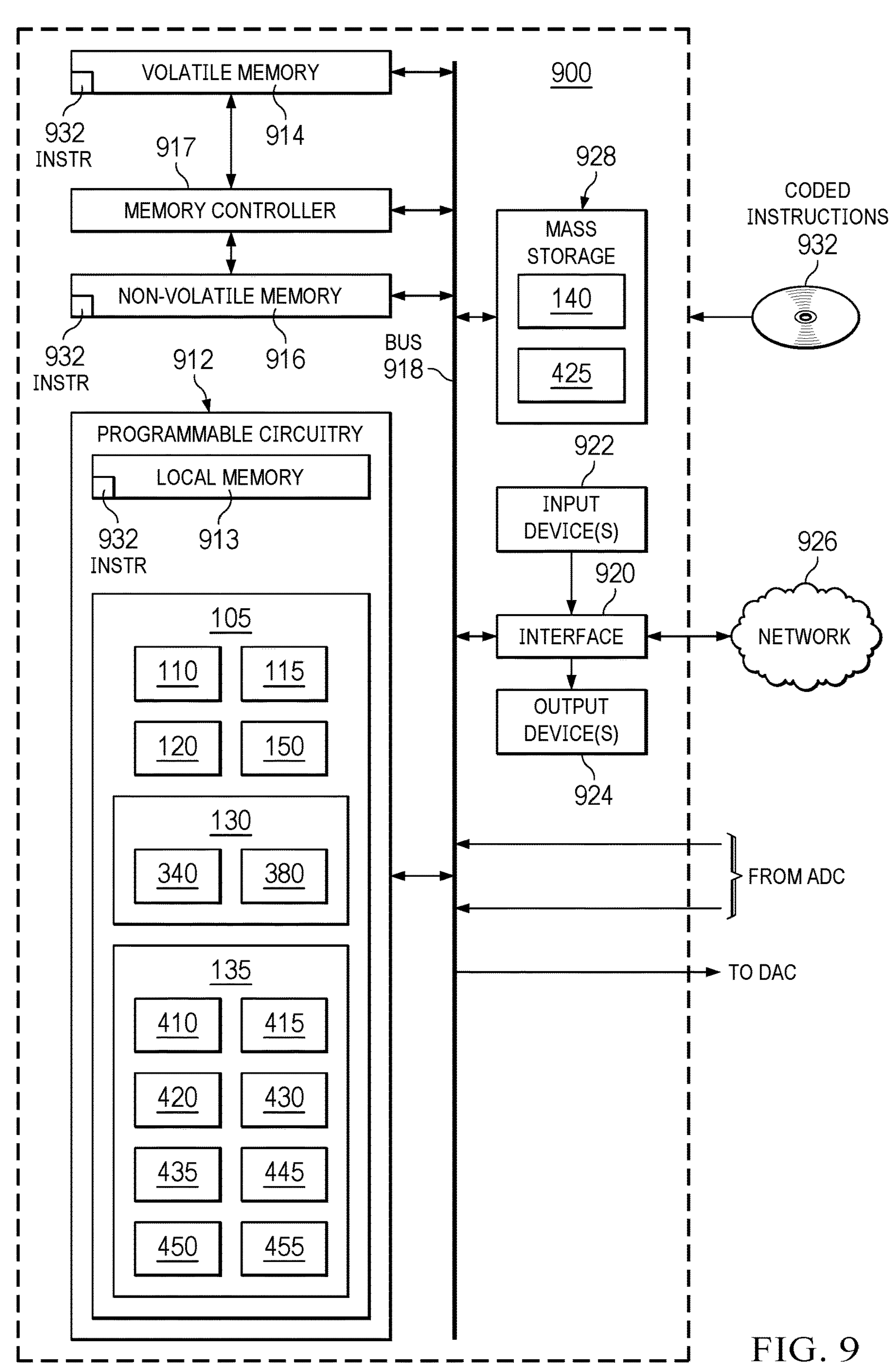
FIG. 9 is a block diagram of an example processing platform including programmable circuitry structured to execute, instantiate, and/or perform the example machine-readable instructions and/or perform the example operations of FIGS. 7A, 7B, 8 to implement the protection circuitry of FIG. 1.

FIG. 9 is a block diagram of an example programmable circuitry platform 900 structured to execute and/or instantiate the example machine-readable instructions and/or the example operations of FIGS. 7A, 7B, 8 to implement the dynamic range correction circuitry 125 of FIG. 1. The programmable circuitry platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements the volume control circuitry 110 of FIG. 1, the psycho-acoustic bass circuitry 115 of FIG. 1, the equalizer circuitry 120 of FIG. 1, the rattle noise suppression circuitry 150 of FIG. 1, the correlation circuitry 340 of FIG. 3, the transfer function fit circuitry 380 of FIG. 3, the V-I conversion circuitry 410 of FIG. 4, the peak tracker circuitry 415 of FIG. 4, the gain determination circuitry 420 of FIG. 4, the delay circuitry 430 of FIG. 4, the multiplication circuitry 435 of FIG. 4, the RTF coefficients circuitry 445 of FIG. 4, the adaptation circuitry 455 of FIG. 4, the subtraction circuitry 450 of FIG. 4, and/or, more generally the protection calibration circuitry 130 of FIGS. 1 and 3 and/or the active protection circuitry 135 of FIGS. 1 and 4.

The programmable circuitry 912 of the illustrated example includes a local memory 913 (e.g., a cache, registers, etc.). The programmable circuitry 912 of the illustrated example is in communication with main memory 914, 916, which includes a volatile memory 914 and a non-volatile memory 916, by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user (e.g., a human user, a machine user, etc.) to enter data and/or commands into the programmable circuitry 912. The input device(s) 922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 900 of the illustrated example also includes one or more mass storage discs or devices 928 to store firmware, software, and/or data. Examples of such mass storage discs or devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 932, which may be implemented by the machine-readable instructions of FIGS. 7A, 7B, 8, may be stored in the mass storage device 928, in the volatile memory 914, in the non-volatile memory 916, and/or on at least one non-transitory computer readable storage medium such as a CD or DVD which may be removable.

Figure 10:
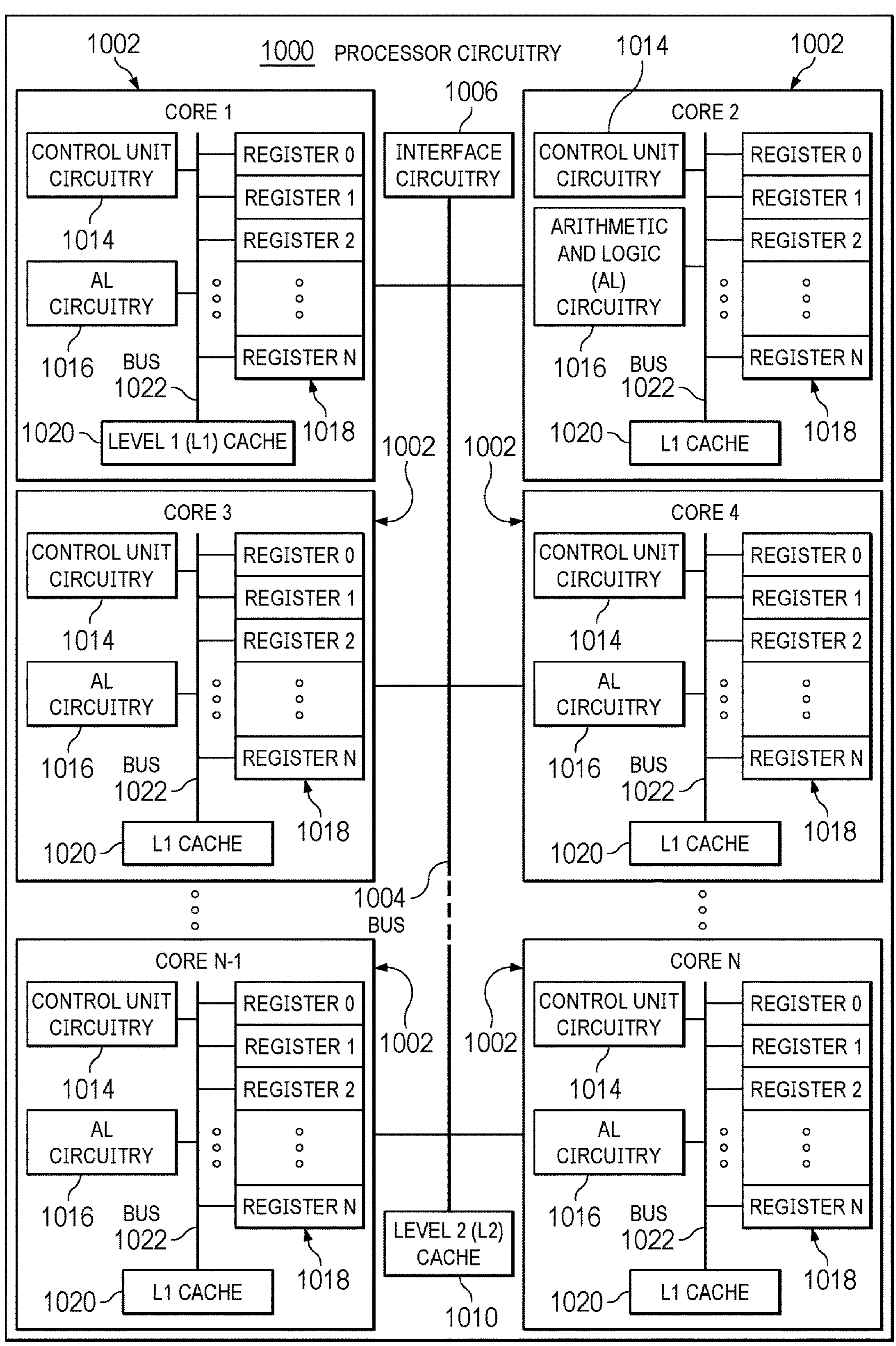
FIG. 10 is a block diagram of an example implementation of the programmable circuitry of FIG. 9.

FIG. 10 is a block diagram of an example implementation of the programmable circuitry 912 of FIG. 9. In this example, the programmable circuitry 912 of FIG. 9 is implemented by a microprocessor 1000. For example, the microprocessor 1000 may be a general-purpose microprocessor (e.g., general-purpose microprocessor circuitry). The microprocessor 1000 executes some or all of the machine-readable instructions of the flowcharts of FIGS. 7A, 7B, 8 to effectively instantiate the circuitry of FIG. 1 as logic circuits to perform operations corresponding to those machine-readable instructions. In some such examples, the circuitry of FIG. 1 is instantiated by the hardware circuits of the microprocessor 1000 in combination with the machine-readable instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine-readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine-readable instructions and/or operations represented by the flowcharts of FIGS. 7A, 7B, 8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating-point operations. In yet other examples, the AL circuitry 1016 may include first AL circuitry that performs integer-based operations and second AL circuitry that performs floating-point operations. In some examples, the AL circuitry 1016 may be referred to as an Arithmetic Logic Unit (ALU).

The registers 1018 are semiconductor-based structures to store data and/or instructions such as results of one or more of the operations performed by the AL circuitry 1016 of the corresponding core 1002. For example, the registers 1018 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure, such as by being distributed throughout the core 1002 to shorten access time. The second bus 1022 may be implemented by at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMS s), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages.

The microprocessor 1000 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those described herein. A GPU, DSP and/or other programmable device can also be an accelerator. Accelerators may be on-board the microprocessor 1000, in the same chip package as the microprocessor 1000 and/or in one or more separate packages from the microprocessor 1000.

Figure 11:
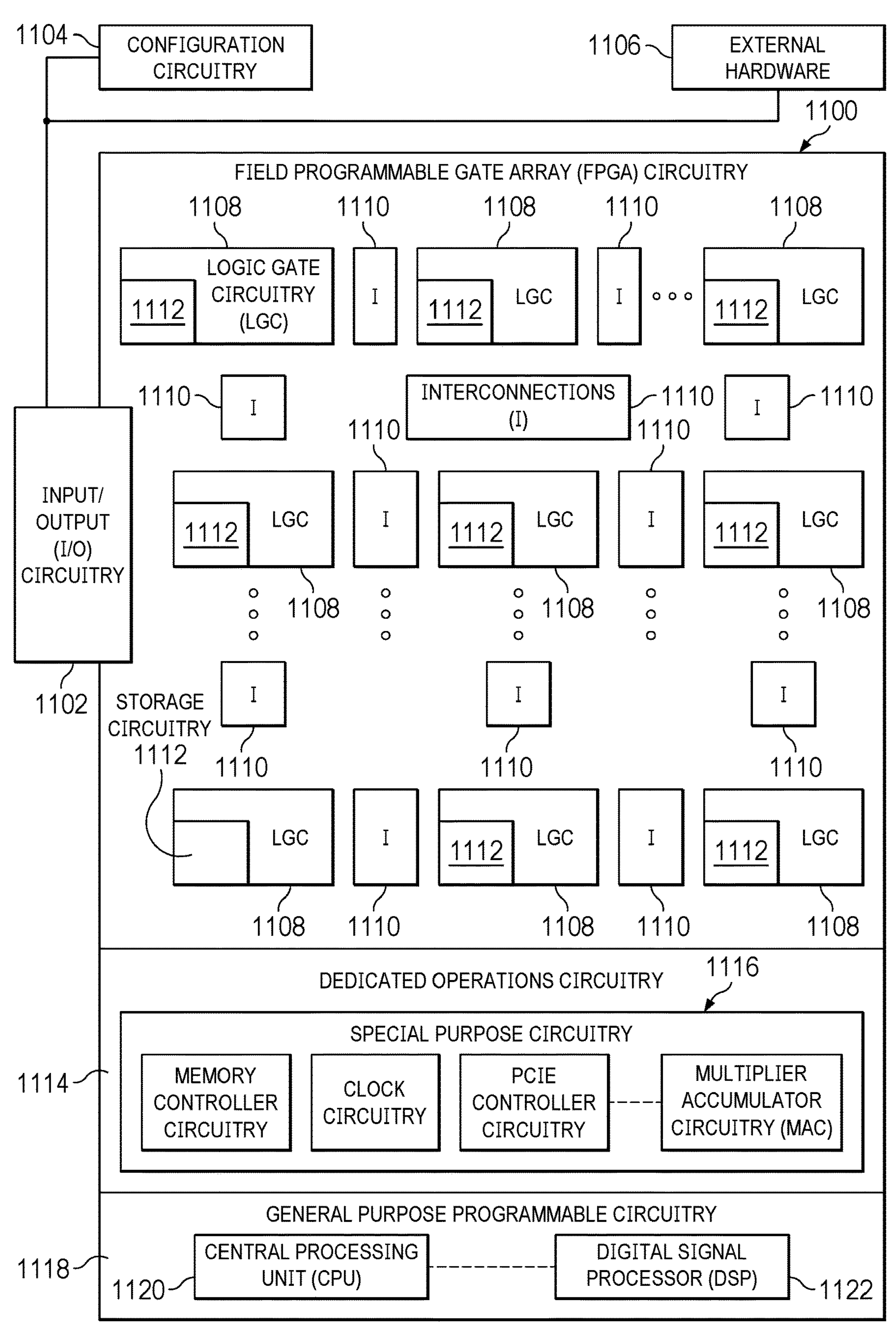
FIG. 11 is a block diagram of another example implementation of the programmable circuitry of FIG. 9.

FIG. 11 is a block diagram of another example implementation of the programmable circuitry 912 of FIG. 9. In this example, the programmable circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine-readable instructions. However, once configured, the FPGA circuitry 1100 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 1000 of FIG. 10 described above (which is a general purpose device that may be programmed to execute some or all of the machine-readable instructions represented by the flowchart(s) of FIGS. 7A, 7B, 8 but whose interconnections and logic circuitry are fixed once fabricated), the FPGA circuitry 1100 of the example of FIG. 11 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 7A, 7B, 8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 7A, 7B, 8. As such, the FPGA circuitry 1100 may be configured and/or structured to effectively instantiate some or all of the operations/functions corresponding to the machine-readable instructions of the flowchart(s) of FIGS. 7A, 7B, 8 as dedicated logic circuits to perform the operations/functions corresponding to those software instructions in a dedicated manner analogous to an ASIC. Therefore, the FPGA circuitry 1100 may perform the operations/functions corresponding to the some or all of the machine-readable instructions of FIGS. 7A, 7B, 8 faster than the general-purpose microprocessor can execute the same.

In the example of FIG. 11, the FPGA circuitry 1100 is configured and/or structured in response to being programmed (and/or reprogrammed one or more times) based on a binary file. In some examples, the binary file may be compiled and/or generated based on instructions in a hardware description language (HDL) such as Lucid, Very High-Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain a binary file, which may be implemented by a bit stream, data, and/or machine-readable instructions, to configure the FPGA circuitry 1100, or portion(s) thereof. In some such examples, the configuration circuitry 1104 may obtain the binary file from a user, a machine (e.g., hardware circuitry (e.g., programmable, or dedicated circuitry) that may implement an Artificial Intelligence/Machine Learning (AI/ML) model to generate the binary file), etc., and/or any combination(s) thereof). In some examples, the external hardware 1106 may be implemented by external hardware circuitry. For example, the external hardware 1106 may be implemented by the microprocessor 1000 of FIG. 10.

The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations/functions that may correspond to at least some of the machine-readable instructions of FIGS. 7A, 7B, 8 and/or other desired operations. The logic gate circuitry 1108 shown in FIG. 11 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations/functions. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example dedicated operations circuitry 1114. In this example, the dedicated operations circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the programmable circuitry 912 of FIG. 9, many other approaches are contemplated. For example, FPGA circuitry may include an on-board CPU, such as one or more of the example CPU 1120 of FIG. 10. Therefore, the programmable circuitry 912 of FIG. 9 may additionally be implemented by combining at least the example microprocessor 1000 of FIG. 10 and the example FPGA circuitry 1100 of FIG. 11. In some such hybrid examples, one or more cores 1002 of FIG. 10 may execute a first portion of the machine-readable instructions represented by the flowchart(s) of FIGS. 7A, 7B, 8 to perform first operation(s)/function(s), the FPGA circuitry 1100 of FIG. 11 may be configured and/or structured to perform second operation(s)/function(s) corresponding to a second portion of the machine-readable instructions represented by the flowcharts of FIG. 7A, 7B, 8, and/or an ASIC may be configured and/or structured to perform third operation(s)/function(s) corresponding to a third portion of the machine-readable instructions represented by the flowcharts of FIGS. 7A, 7B, 8.

It should be understood that some or all of the circuitry of FIG. 1 may, thus, be instantiated at the same or different times. For example, same and/or different portion(s) of the microprocessor 1000 of FIG. 10 may be programmed to execute portion(s) of machine-readable instructions at the same and/or different times. In some examples, same and/or different portion(s) of the FPGA circuitry 1100 of FIG. 11 may be configured and/or structured to perform operations/functions corresponding to portion(s) of machine-readable instructions at the same and/or different times.

In some examples, some or all of the circuitry of FIGS. 3 and 4 may be instantiated, for example, in one or more threads executing concurrently and/or in series. For example, the microprocessor 1000 of FIG. 10 may execute machine-readable instructions in one or more threads executing concurrently and/or in series. In some examples, the FPGA circuitry 1100 of FIG. 11 may be configured and/or structured to carry out operations/functions concurrently and/or in series. Moreover, in some examples, some or all of the circuitry of FIGS. 3 and 4 may be implemented within one or more virtual machines and/or containers executing on the microprocessor 1000 of FIG. 10.

In some examples, the programmable circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the programmable circuitry 912 of FIG. 9, which may be in one or more packages. For example, the XPU may include a CPU (e.g., the microprocessor 1000 of FIG. 10, the CPU 1120 of FIG. 11, etc.) in one package, a DSP (e.g., the DSP 1122 of FIG. 11) in another package, a GPU in yet another package, and an FPGA (e.g., the FPGA circuitry 1100 of FIG. 11) in still yet another package.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Numerical identifiers such as "first", "second", "third", etc. are used merely to distinguish between elements of substantially the same type in terms of structure and/or function. These identifiers as used in the detailed description do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

Modifications are possible in the described embodiments, and other embodiments are possible, within the scope of the claims.

What is claimed is:

1. An apparatus comprising:

programmable circuitry configured to execute machine-readable instructions to:

receive a first input signal having first voltages;

receive second voltages and first currents, the second voltages and first currents representing voltages and currents of filter circuitry responsive to the first voltages;

determine a transfer function based on the first voltages, second voltages, and first currents, the transfer function having coefficients representing the filter circuitry; and predict second currents based on third voltages and the coefficients of the transfer function, the third voltages representing a second input signal subsequent to the first input signal.

2. The apparatus of claim 1, wherein the programmable circuitry is further configured to:

compare the second currents to a current limit;

determine a gain based on the second currents and the current limit; and modify the second input signal by the gain.

3. The apparatus of claim 1, wherein the programmable circuitry is further configured to:

receive fourth voltages and third currents of the filter circuitry, the fourth voltages and third currents representing voltages and currents of the filter circuitry responsive to the third voltages;

predict fourth currents based on the fourth voltages and the coefficients of the transfer function; and determine a difference between the third currents and the fourth currents.

4. The apparatus of claim 3, wherein the programmable circuitry is further configured to adjust the coefficients of the transfer function based on the difference between the third currents and the fourth currents.

5. The apparatus of claim 1, wherein the programmable circuitry is further configured to modify the coefficients of the transfer function to modify the transfer function.

6. The apparatus of claim 1, further comprising:

an amplifier having an input and an output, the input of the amplifier coupled to the programmable circuitry;

the filter circuitry having a first terminal, a second terminal, and a third terminal, the first terminal of the filter circuitry coupled to the programmable circuitry, the second terminal of the filter circuitry coupled to the output of the amplifier; and a speaker having a terminal coupled to the third terminal of the filter circuitry.

7. A system comprising:

filter circuitry having an input and an output;

an amplifier having an input and an output, the output of the amplifier coupled to the input of the filter circuitry; and protection circuitry having an input and an output, the input of the protection circuitry coupled to the output of the filter circuitry, the output of the protection circuitry coupled to the input of the amplifier, the protection circuitry configured to:

receive a sense voltage responsive to supplying an input signal, the sense voltage representing a voltage of the filter circuitry;

predict a sense current based on the sense voltage and coefficients of a transfer function that represents the filter circuitry;

receive the sense current responsive to supplying the input signal to the filter circuitry; and adjust the coefficients based on differences between the predicted sense current and the sense current of the filter circuitry.

8. The system of claim 7, wherein the protection circuitry is further configured to:

supply a calibration signal as the input signal to the amplifier;

receive the sense current and the sense voltage responsive to supplying the calibration signal; and determine the coefficients of the transfer function based on the sense current and the sense voltage.

9. The system of claim 7, wherein the protection circuitry is further configured to:

determine currents of the input signal based on the input signal and the coefficients;

determine a peak current of the currents of the input signal;

determine a gain based on the peak current and a current limit; and modify the input signal by the gain.

10. The system of claim 7, wherein the input signal is a first input signal, the protection circuitry is further configured to convert voltages of a second input signal to currents of the second input signal based on the coefficients.

11. The system of claim 7, wherein the protection circuitry is further configured to limit a current supplied to the amplifier based on the input signal and the coefficients.

12. The system of claim 7, wherein the protection circuitry is further configured to reduce differences between the predicted sense current and the sense current of the filter circuitry.

13. The system of claim 7, wherein the output of the filter circuitry is a first output, the filter circuitry having a second output, the system further comprising a piezoelectric speaker coupled to the second output of the filter circuitry.

14. At least one non-transitory computer readable storage medium comprising instructions that, when executed, cause programmable circuitry to at least:

receive a first input signal;

receive first voltages and first currents responsive to supplying the input first signal to an amplifier, the first voltages and first currents representing voltages and currents of filter circuitry;

determine coefficients based on the first input signal, first voltages, and first currents, the coefficients of a transfer function representing the filter circuitry; and receive second voltages and second currents of the filter circuitry responsive to supplying a second input signal to the amplifier.

15. The at least one non-transitory computer readable storage medium of claim 14, wherein the instructions further cause the programmable circuitry to:

predict third currents based on the coefficients and the second voltages of the filter circuitry; and determine a difference between the second currents of the filter circuitry and the third currents.

16. The at least one non-transitory computer readable storage medium of claim 15, wherein the instructions further cause the programmable circuitry to adjust the coefficients based on the difference between the second currents of the filter circuitry and the third currents.

17. The at least one non-transitory computer readable storage medium of claim 14, wherein the instructions further cause the programmable circuitry to:

receive a third input signal having third voltages, and determine third currents of the filter circuitry based on the third voltages and the coefficients.

18. The at least one non-transitory computer readable storage medium of claim 17, wherein the instructions further cause the programmable circuitry to:

determine a gain based on differences between the third currents and a current limit; and modify the third voltages by the gain.

* * * * *